United States Patent
Burtovyy et al.

(10) Patent No.: US 11,697,744 B2
(45) Date of Patent: *Jul. 11, 2023

(54) HIGH IMPACT STRENGTH 3D PRINTING MATERIALS DERIVED FROM POLYCYCLOOLEFIN MONOMERS AND CROSSLINKERS

(71) Applicant: PROMERUS, LLC, Akron, OH (US)

(72) Inventors: Oleksandr Burtovyy, Akron, OH (US); Wei Zhang, Akron, OH (US); Leah Langsdorf, Akron, OH (US); Larry F Rhodes, Akron, OH (US)

(73) Assignee: PROMERUS, LLC, Akron, OH (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/471,768

(22) Filed: Sep. 10, 2021

(65) Prior Publication Data

US 2022/0010157 A1 Jan. 13, 2022

Related U.S. Application Data

(63) Continuation of application No. 16/724,600, filed on Dec. 23, 2019, now Pat. No. 11,142,662.

(60) Provisional application No. 62/830,867, filed on Apr. 8, 2019, provisional application No. 62/783,347, filed on Dec. 21, 2018.

(51) Int. Cl.
| | |
|---|---|
| *C08F 2/46* | (2006.01) |
| *C08F 2/50* | (2006.01) |
| *C08G 61/04* | (2006.01) |
| *C09D 11/38* | (2014.01) |
| *B33Y 70/00* | (2020.01) |
| *C09D 11/101* | (2014.01) |
| *C09D 11/108* | (2014.01) |

(52) U.S. Cl.
CPC ............ *C09D 11/38* (2013.01); *B33Y 70/00* (2014.12); *C09D 11/101* (2013.01); *C09D 11/108* (2013.01)

(58) Field of Classification Search
CPC ..... C09D 11/38; C09D 11/108; C09D 11/101; B33Y 70/00; C08L 65/00; C08G 61/08; C08G 2261/135; C08G 2261/144; C08G 2261/148; C08G 2261/62; C08G 2261/76; C08G 2261/3325

USPC ............ 522/26, 7, 6, 189, 184, 71, 1; 520/1
See application file for complete search history.

(56) References Cited

U.S. PATENT DOCUMENTS

| | | | |
|---|---|---|---|
| 11,142,662 B2* | 10/2021 | Burtovyy | B33Y 70/00 |
| 2003/0212233 A1* | 11/2003 | Angeletakis | C08G 77/20 |
| | | | 528/15 |
| 2006/0041093 A1* | 2/2006 | Ravikiran | C08G 61/06 |
| | | | 526/280 |
| 2006/0241257 A1 | 10/2006 | Angeletakis | |
| 2016/0326340 A1 | 11/2016 | Tabei et al. | |
| 2017/0058145 A1 | 3/2017 | Rhodes et al. | |
| 2017/0306171 A1 | 10/2017 | Vidavsky et al. | |
| 2018/0194880 A1 | 7/2018 | Rhodes et al. | |
| 2019/0039321 A1 | 2/2019 | Matzner et al. | |
| 2019/0232267 A1* | 8/2019 | Burtovyy | C08G 61/12 |
| 2020/0002466 A1 | 1/2020 | Burtovyy et al. | |

FOREIGN PATENT DOCUMENTS

WO  WO 2017/040737 A1  3/2017

OTHER PUBLICATIONS

Stijn Monsaert, et al., "Latent Olefin metathesis catalysts," Chem. Soc. Rev., 2009, 38, 3360-3372.

* cited by examiner

*Primary Examiner* — Jessica Whiteley

(74) *Attorney, Agent, or Firm* — Balaram Gupta

(57) ABSTRACT

Embodiments in accordance with the present invention encompass a composition containing a latent catalyst and a compound capable of generating a Bronsted acid with a counterion capable of coordinating and activating the latent catalyst along with one or more monomers which undergo ring open metathesis polymerization (ROMP) and one or more multi-functional crosslinkable molecules when said composition is exposed to a suitable radiation forms a three-dimensional (3D) object. The catalyst system employed therein can be sensitive to oxygen and thus inhibits polymerization in ambient atmospheric conditions. The three-dimensional objects made by this process exhibits improved mechanical properties, particularly, high distortion temperature, impact strength, elongation to break, among others. Accordingly, compositions of this invention are useful as 3D inkjet materials for forming high impact strength objects of various sizes with microscale features lower than 100 microns, among various other uses.

20 Claims, No Drawings

HIGH IMPACT STRENGTH 3D PRINTING MATERIALS DERIVED FROM POLYCYCLOOLEFIN MONOMERS AND CROSSLINKERS

CROSS REFERENCE TO RELATED APPLICATIONS

This application is a continuation of U.S. application Ser. No. 16/724,600, filed Dec. 23, 2019, now allowed, which claims the benefit of U.S. Provisional Application No. 62/783,347, filed Dec. 21, 2018, and U.S. Provisional Application No. 62/830,867, filed Apr. 8, 2019, all of which are incorporated herein by reference in their entirety.

BACKGROUND OF THE INVENTION

Field of the Invention

Embodiments in accordance with the present invention relate generally to a single component composition containing mass polymerizable polycycloolefin monomer(s), crosslinkers and a catalyst which is activated photolytically by a compound capable of generating Bronsted acid with a counterion capable of coordinating and activating the latent catalyst useful as three-dimensional (3D) printing materials. The compositions so formed exhibit high mechanical properties, specifically exhibiting high impact strength having utility in a variety of applications including as 3D ink compositions, among other uses. More specifically, this invention relates to room temperature stable single component compositions encompassing norbornene (NB) and dicyclopentadiene (DCPD) based olefinic monomers and an oxygen sensitive catalyst system which is activated under photolytic conditions thereby undergoing mass polymerization to form solid objects, including films, vias, patterned lines, among others.

Description of the Art

Recently there has been an increased interest in developing 3D ink compositions which can produce 3D objects having finer structures at micron levels. A few of the recently introduced 3D ink systems are capable of continuous production of 3D objects which are useful in a variety of diversified applications including for example tissue engineering to electronic components. See for example, J. M. DeSimone et al., Science, Vol. 347, pp 1349-1352 (2015), where it is disclosed a continuous liquid interface production (CLIP), which is controlled by a "dead zone" to avoid any oxygen sensitivity of the 3D ink materials employed therein, which allows fabrication of a series of objects at much faster speed and with high resolution such that the objects so formed can feature patterns in the 50 to 100 micron range.

WO2017/068590 A1 discloses a series of 3D inkjet printing materials using dicyclopentadiene compounds polymerizable by ring-opening metathesis polymerization methods.

U.S. Pat. No. 9,909,022 B2 discloses various ink compositions which when printed and cured forms organic thin films on a substrate. Such ink compositions are contemplated to be used in organic light emitting diode (OLED) displays. The compositions disclosed therein are generally curable polyethylene glycol acrylates and polyol acrylates, which are known to be not stable at temperatures higher than 200° C.

Accordingly, there is still a need for developing 3D printing materials that can be cured at a faster speed and exhibit desirable thermal and mechanical properties for fabricating industrially useful 3D objects, films and patterned features at a lower cost.

Thus, it is an object of this invention to provide 3D printing compositions that overcome the gaps faced by the art. More specifically, it is an object of this invention to provide a single component composition that will mass polymerize rapidly under inert atmospheres to form 3D objects under the conditions of 3D printing system. It is further an object of this invention to provide stable single component mass polymerizable composition with no change in viscosity at or below normal storage conditions but which undergoes mass polymerization only under the 3D process conditions producing solid objects featuring very high impact strength.

Other objects and further scope of the applicability of the present invention will become apparent from the detailed description that follows.

SUMMARY OF THE INVENTION

Surprisingly, it has now been found that by employing a single component filler composition, it is now possible to form three dimensional objects having improved thermal and mechanical properties, most notably the compositions of this invention can be tailored to desirable thermo-mechanical properties. For example, the compositions of this invention can be tailored to exhibit glass transition temperatures ($T_g$) higher than 150° C., high heat distortion temperature (HDT, higher than 50° C. at 1.82 MPa/264 psi), high elongation to break (greater than 100 percent), high impact strength (Izod impact strength of about 100 J/m or higher) and high tensile strength (greater than 50 MPa). It is also important to note that the compositions of this invention can be mass polymerized under photolytic conditions at a faster speed and thus can be employed in any of the 3D technologies, including layer by layer approach, inkjet formulations and in the stereolithographic applications involving continuous liquid interface production of 3D objects. The compositions of this invention are expected to exhibit faster photopolymerizing capabilities thus enabling to form a wide variety of objects of different sizes, including sizes greater than 10 inches and structural details lower than 50 μm. Further, compositions of this invention are also expected to exhibit low shrinkage due to their rigid polycycloolefinic structure. In addition, as the components of this invention undergo fast mass polymerization upon application they do not leave behind any fugitive small molecules which needs further processing. Generally, no other small molecule additives need to be employed thus offering additional advantages. Most importantly, the compositions of this invention are stable (i. e., no change in viscosity) at ambient atmospheric conditions including up to 35° C. for several hours to days, and undergo mass polymerization only under photolytic conditions.

Accordingly, there is provided a single component composition encompassing:

a) one or more monomers of formula (I):

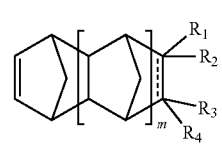

wherein:

m is an integer 0, 1 or 2;

═══ is a single bond or a double bond;

$R_1$, $R_2$, $R_3$ and $R_4$ are the same or different and each independently selected from the group consisting of hydrogen, halogen, methyl, ethyl, linear or branched $(C_3-C_{16})$alkyl, $(C_2-C_{16})$alkenyl, perfluoro$(C_1-C_{12})$alkyl, $(C_3-C_{12})$cycloalkyl, $(C_6-C_{12})$bicycloalkyl, $(C_7-C_{14})$tricycloalkyl, methoxy, ethoxy, linear or branched $(C_3-C_{16})$alkoxy, $(C_2-C_6)$acyl, $(C_2-C_6)$acyloxy, $(C_6-C_{14})$aryl, $(C_6-C_{14})$aryl$(C_1-C_6)$alkyl, perfluoro$(C_6-C_{14})$aryl, perfluoro$(C_6-C_{14})$aryl$(C_1-C_3)$alkyl, $(C_6-C_{14})$aryloxy, $(C_6-C_{14})$aryl$(C_1-C_6)$alkoxy, tri$(C_1-C_6)$alkoxysilyl and a group of formula (A):

—Z-Aryl    (A)

wherein:

Z is a bond or a group selected from the group consisting of:

$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—(CO)O—$(CR_5R_6)_b$, $(CR_5R_6)_a$—O(CO)—$(CR_5R_6)_b$, $(CR_5R_6)_a$—(CO)—$(CR_5R_6)_b$, where a and b are integers which may be the same or different and each independently is 1 to 12;

$R_5$ and $R_6$ are the same or different and each independently selected from the group consisting of hydrogen, methyl, ethyl, linear or branched $(C_3-C_6)$alkyl, methoxy, ethoxy, linear or branched $(C_3-C_6)$alkyloxy, $(C_2-C_6)$acyl, $(C_2-C_6)$acyloxy, phenyl and phenoxy;

Aryl is phenyl or phenyl substituted with one or more of groups selected from the group consisting of methyl, ethyl, linear or branched $(C_3-C_6)$alkyl, hydroxy, methoxy, ethoxy, linear or branched $(C_3-C_6)$alkyloxy, $(C_2-C_6)$acyl, $(C_2-C_6)$acyloxy, phenyl and phenoxy; or one of $R_1$ or $R_2$ taken together with one of $R_3$ or $R_4$ and the carbon atoms to which they are attached to form a $(C_5-C_7)$carbocyclic ring optionally containing one or more double bonds;

b) optionally one or more monomers of formula (IV):

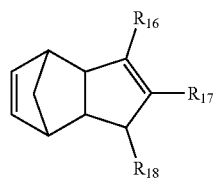

(IV)

wherein $R_{16}$ and $R_{17}$ are the same or different and each independently selected from the group consisting of hydrogen, methyl, ethyl, linear or branched $(C_3-C_6)$alkyl, methoxy, ethoxy, linear or branched $(C_3-C_6)$alkyloxy, acetoxy, $(C_2-C_6)$acyl, phenyl and phenoxy; or $R_{16}$ taken together with $R_{17}$ and the carbon atoms to which they are attached to form a $(C_5-C_7)$carbocyclic ring optionally containing one or more double bonds;

$R_{18}$ is hydrogen, halogen, methyl, ethyl, linear or branched $(C_3-C_{16})$alkyl, $(C_6-C_{10})$aryl, $(C_6-C_{10})$aryl$(C_1-C_6)$alkyl, hydroxy, methoxy, ethoxy, linear or branched $(C_3-C_{16})$alkoxy, $(C_6-C_{10})$aryloxy, $(C_6-C_{10})$aryl$(C_1-C_6)$alkoxy, —O(CO)$R_{19}$ and —O(CO)O$R_{19}$, where $R_{19}$ is methyl, ethyl, linear or branched $(C_3-C_{16})$alkyl, $(C_6-C_{10})$aryl and $(C_6-C_{10})$aryl$(C_1-C_6)$alkyl;

c) optionally one or more compounds selected from the group consisting of:

i) a compound of formula (VIIa):

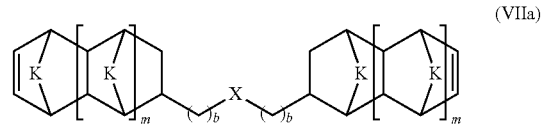

(VIIa)

ii) a compound of formula (VIIb):

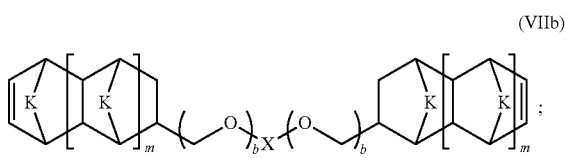

(VIIb)

and iii) a compound of formula (VIIc):

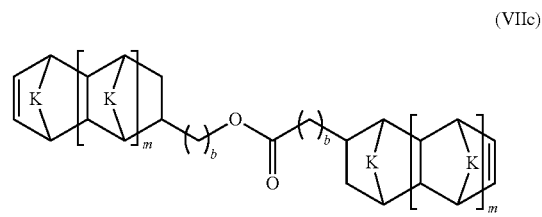

(VIIc)

where m is an integer 0, 1 or 2;

b is an integer from 1 to 10;

K is selected from the group consisting of $CH_2$, $CH_2$—$CH_2$, O and S;

X is selected from the group consisting of O, S, $NR_a$, $SiR_bR_c$, $SiR_bR_cO(SiR_bR_cO)_nSiR_bR_c$, $SiR_bR_c(C_6-C_{10})$aryl-$SiR_bR_c$, —C(O)—, —C(O)O—, —OC(O)—, —OC(O)O—, —S—C(O)—, —C(O)—S—, —CH=CH— and —C≡C—;

$R_a$, $R_b$ and $R_c$ are independently of each other selected from the group consisting of hydrogen, methyl, ethyl or a linear or branched $(C_3-C_{12})$alkyl, $(C_3-C_8)$cycloalkyl, $(C_5-C_{12})$bicycloalkyl, $(C_5-C_{12})$bicycloalkenyl and $(C_5-C_{12})$bicycloalkenyl$(C_1-C_3)$alkylSi$(CH_3)_2$, and such that O, $NR_a$ and/or S atoms are not linked directly to one another; and n is an integer from 0 to 10;

d) a latent organo-transition metal catalyst comprising a metal selected from the group consisting of ruthenium and osmium; and e) a compound capable of releasing a Bronsted acid when subjected to photolytic conditions; and wherein said composition is in a clear liquid form at room temperature.

In another aspect of this invention there is also provided a kit encompassing the composition of this invention for forming a three dimensional object.

DETAILED DESCRIPTION

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the expression "alkyl" means a saturated, straight-chain or branched-chain hydrocarbon substituent having the specified number of carbon atoms. Particular alkyl groups are methyl, ethyl, n-propyl, isopropyl, tert-butyl, and so on. Derived expressions such as "alkoxy", "thioalkyl", "alkoxyalkyl", "hydroxyalkyl", "alkylcarbonyl", "alkoxycarbonylalkyl", "alkoxycarbonyl", "diphenylalkyl", "phenylalkyl", "phenylcarboxyalkyl" and "phenoxyalkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "perhaloalkyl" represents the alkyl, as defined above, wherein all of the hydrogen atoms in said alkyl group are replaced with halogen atoms selected from fluorine, chlorine, bromine or iodine. Illustrative examples include trifluoromethyl, trichloromethyl, tribromomethyl, triiodomethyl, pentafluoroethyl, pentachloroethyl, pentabromoethyl, pentaiodoethyl, and straight-chained or branched heptafluoropropyl, heptachloropropyl, heptabromopropyl, nonafluorobutyl, nonachlorobutyl, undecafluoropentyl, undecachloropentyl, tridecafluorohexyl, tridecachlorohexyl, and the like. Derived expression, "perhaloalkoxy", is to be construed accordingly. It should further be noted that certain of the alkyl groups as described herein, such as for example, "alkyl" may partially be fluorinated, that is, only portions of the hydrogen atoms in said alkyl group are replaced with fluorine atoms and shall be construed accordingly.

As used herein the expression "acyl" shall have the same meaning as "alkanoyl", which can also be represented structurally as "R—CO—," where R is an "alkyl" as defined herein having the specified number of carbon atoms. Additionally, "alkylcarbonyl" shall mean same as "acyl" as defined herein. Specifically, "$(C_1-C_4)$acyl" shall mean formyl, acetyl or ethanoyl, propanoyl, n-butanoyl, etc. Derived expressions such as "acyloxy" and "acyloxyalkyl" are to be construed accordingly.

As used herein, the expression "aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "arylalkyl" means that the aryl as defined herein is further attached to alkyl as defined herein. Representative examples include benzyl, phenylethyl, 2-phenylpropyl, 1-naphthylmethyl, 2-naphthylmethyl and the like.

As used herein, the expression "alkenyl" means a non-cyclic, straight or branched hydrocarbon chain having the specified number of carbon atoms and containing at least one carbon-carbon double bond, and includes ethenyl and straight-chained or branched propenyl, butenyl, pentenyl, hexenyl, and the like. Derived expression, "arylalkenyl" and five membered or six membered "heteroarylalkenyl" is to be construed accordingly. Illustrative examples of such derived expressions include furan-2-ethenyl, phenylethenyl, 4-methoxyphenylethenyl, and the like.

As used herein, the expression "heteroaryl" includes all of the known heteroatom containing aromatic radicals. Representative 5-membered heteroaryl radicals include furanyl, thienyl or thiophenyl, pyrrolyl, isopyrrolyl, pyrazolyl, imidazolyl, oxazolyl, thiazolyl, isothiazolyl, and the like. Representative 6-membered heteroaryl radicals include pyridinyl, pyridazinyl, pyrimidinyl, pyrazinyl, triazinyl, and the like radicals. Representative examples of bicyclic heteroaryl radicals include, benzofuranyl, benzothiophenyl, indolyl, quinolinyl, isoquinolinyl, cinnolyl, benzimidazolyl, indazolyl, pyridofuranyl, pyridothienyl, and the like radicals.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of $(C_1-C_6)$alkyl, $(C_2-C_6)$alkenyl, $(C_1-C_6)$perfluoroalkyl, phenyl, hydroxy, —$CO_2H$, an ester, an amide, $(C_1-C_6)$alkoxy, $(C_1-C_6)$thioalkyl and $(C_1-C_6)$perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

By the term "latent organo-transition metal catalyst" is meant organo-transition metal compounds that show little or no catalytic activity at a particular (usually ambient atmospheric conditions) temperature and initiate such activity upon exposure to suitable radiation.

By the term "three dimensional object" or "3D object" means any of the macroscale or microscale objects that can be formed from the compositions of this invention by any of the known techniques having a wide variety of applications including electronic, optoelectronic, and other applications.

By the term "derived" is meant that the polymeric repeating units are polymerized (formed) from, for example, polycyclic monomers, such as norbornene-type monomers in accordance with formulae (I) or (IV) wherein the resulting polymers are ring opened metathesis polymerized (ROMP), for example, the 2,3 double bond of norbornene-type monomers are ring opened and polymerized as shown below:

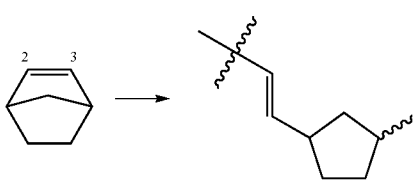  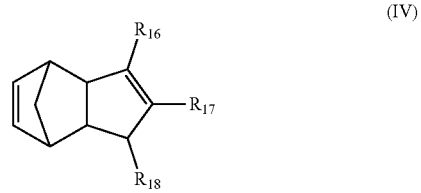

Accordingly, in accordance with the practice of this invention there is provided a single component mass polymerizable composition encompassing:

a) one or more monomers of formula (I):

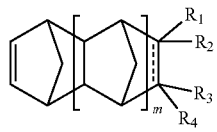

(I)

wherein:

m is an integer 0, 1 or 2;

═══ is a single bond or a double bond;

$R_1$, $R_2$, $R_3$ and $R_4$ are the same or different and each independently selected from the group consisting of hydrogen, halogen, methyl, ethyl, linear or branched $(C_3-C_{16})$ alkyl, $(C_2-C_{16})$alkenyl, perfluoro$(C_1-C_{12})$alkyl, $(C_3-C_{12})$cycloalkyl, $(C_6-C_{12})$bicycloalkyl, $(C_7-C_{14})$tricycloalkyl, methoxy, ethoxy, linear or branched $(C_3-C_{16})$alkoxy, $(C_2-C_6)$acyl, $(C_2-C_6)$acyloxy, $(C_6-C_{14})$aryl, $(C_6-C_{14})$aryl$(C_1-C_6)$alkyl, perfluoro$(C_6-C_{14})$aryl, perfluoro$(C_6-C_{14})$aryl$(C_1-C_3)$alkyl, $(C_6-C_{14})$aryloxy, $(C_6-C_{14})$aryl$(C_1-C_6)$alkoxy, tri$(C_1-C_6)$alkoxysilyl and a group of formula (A):

—Z-Aryl (A)

wherein:

Z is a bond or a group selected from the group consisting of:

$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—(CO)O—$(CR_5R_6)_b$, $(CR_5R_6)_a$—O(CO)—$(CR_5R_6)_b$, $(CR_5R_6)_a$—(CO)—$(CR_5R_6)_b$, where a and b are integers which may be the same or different and each independently is 1 to 12;

$R_5$ and $R_6$ are the same or different and each independently selected from the group consisting of hydrogen, methyl, ethyl, linear or branched $(C_3-C_6)$alkyl, methoxy, ethoxy, linear or branched $(C_3-C_6)$alkyloxy, $(C_2-C_6)$acyl, $(C_2-C_6)$acyloxy, phenyl and phenoxy;

Aryl is phenyl or phenyl substituted with one or more groups selected from the group consisting of methyl, ethyl, linear or branched $(C_3-C_6)$alkyl, hydroxy, methoxy, ethoxy, linear or branched $(C_3-C_6)$alkyloxy, $(C_2-C_6)$acyl, $(C_2-C_6)$acyloxy, phenyl and phenoxy; or one of $R_1$ or $R_2$ taken together with one of $R_3$ or $R_4$ and the carbon atoms to which they are attached to form a $(C_5-C_7)$carbocyclic ring optionally containing one or more double bonds;

b) optionally one or more monomers of formula (IV):

(IV)

wherein $R_{16}$ and $R_{17}$ are the same or different and each independently selected from the group consisting of hydrogen, methyl, ethyl, linear or branched $(C_3-C_6)$alkyl, methoxy, ethoxy, linear or branched $(C_3-C_6)$alkyloxy, acetoxy, $(C_2-C_6)$acyl, phenyl and phenoxy; or $R_{16}$ taken together with $R_{17}$ and the carbon atoms to which they are attached to form a $(C_5-C_7)$carbocyclic ring optionally containing one or more double bonds;

$R_{18}$ is hydrogen, halogen, methyl, ethyl, linear or branched $(C_3-C_{16})$alkyl, $(C_6-C_{10})$aryl, $(C_6-C_{10})$aryl$(C_1-C_6)$alkyl, hydroxy, methoxy, ethoxy, linear or branched $(C_3-C_{16})$alkoxy, $(C_6-C_{10})$aryloxy, $(C_6-C_{10})$aryl$(C_1-C_6)$alkoxy, —O(CO)$R_{19}$ and —O(CO)O$R_{19}$, where $R_{19}$ is methyl, ethyl, linear or branched $(C_3-C_{16})$alkyl, $(C_6-C_{10})$aryl and $(C_6-C_{10})$aryl$(C_1-C_6)$alkyl;

c) optionally one or more compounds selected from the group consisting of:

i) a compound of formula (VIIa):

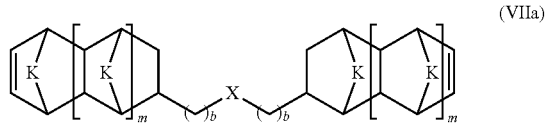

(VIIa)

ii) a compound of formula (VIIb):

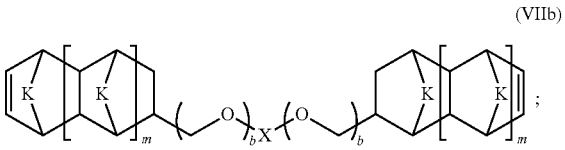

(VIIb)

and iii) a compound of formula (VIIc):

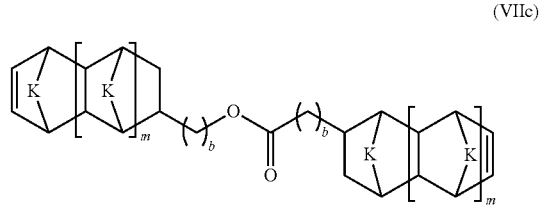

(VIIc)

where m is an integer 0, 1 or 2;

b is an integer from 1 to 10;

K is selected from the group consisting of $CH_2$, $CH_2$—$CH_2$, O and S;

X is selected from the group consisting of O, S, $NR_a$, $SiR_bR_c$, $SiR_bR_cO(SiR_bR_cO)_nSiR_bR_c$, $SiR_bR_c(C_6-C_{10})$aryl-$SiR_bR_c$, —C(O)—, —C(O)O—, —OC(O)—, —OC(O)—O—, —S—C(O)—, —C(O)—S—, —CH═CH— and —C≡C—;

$R_a$, $R_b$ and $R_c$ are independently of each other selected from the group consisting of hydrogen, methyl, ethyl or a linear or branched $(C_3-C_{12})$alkyl, $(C_3-C_8)$cycloalkyl, $(C_5-C_{12})$bicycloalkyl, $(C_5-C_{12})$bicycloalkenyl and $(C_5-C_{12})$bicycloalkenyl$(C_1-C_3)$alkylSi$(CH_3)_2$, and such that O, $NR_a$ and/or S atoms are not linked directly to one another; and n is an integer from 0 to 10;

d) a latent organo-transition metal catalyst comprising a metal selected from the group consisting of ruthenium and osmium; and e) a compound capable of releasing a Bronsted acid when subjected to photolytic conditions; and wherein said composition is in a clear liquid form at room temperature.

As used herein the Aryl may further include the following:

substituted or unsubstituted biphenyl of formula:

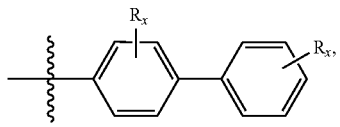

substituted or unsubstituted naphthyl of formula:

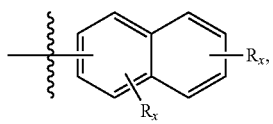

substituted or unsubstituted terphenyl of formula:

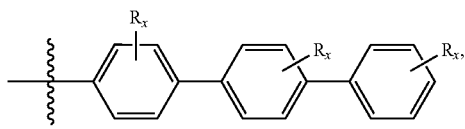

substituted or unsubstituted anthracenyl of formula:

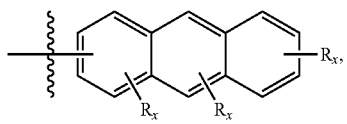

substituted or unsubstituted fluorenyl of formula:

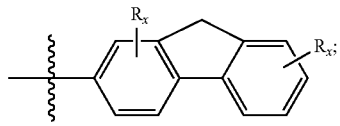

where $R_x$ in each occurrence is independently selected from methyl, ethyl, linear or branched $(C_3-C_{12})$alkyl or $(C_6-C_{10})$aryl.

The monomers employed in the composition of this invention are themselves known in the literature or can be prepared by any of the known methods in the art to make such or similar types of monomers.

In addition, the monomers as described herein readily undergo mass polymerization, i.e., substantially in their neat form without use of any solvents when polymerized under mass ring open metathesis polymerization (ROMP) conditions using certain transition metal catalysts, such as for example, organo-ruthenium and organo-osmium compounds. See for example, R. H. Grubbs et al., *Handbook of Metathesis*, Ed.: Wiley-VCH, Weinheim, Germany, 2003, R. H. Grubbs et al., *Acc. Chem. Res.* 2001, 34, 18-29, R. H. Grubbs et al., *Angew. Chem. Int. Ed.*, 2006, 45, 3760-3765. Also, see U.S. Pat. No. 6,838,489, pertinent portions of which are incorporated herein by reference. The term "mass polymerization" as used herein shall have the generally accepted meaning in the art. That is, a polymerization reaction that is generally carried out substantially in the absence of a solvent. In some cases, however, a small proportion of solvent is present in the reaction medium. For example, such small amounts of solvent may be used to dissolve the latent catalyst and/or the activator or convey the same to the reaction medium. Also, some solvent may be used to reduce the viscosity of the monomer or to dissolve the monomer if it is in a solid form. In some cases the co-monomer, if employed, may itself serve as a solvent both to reduce the viscosity and/or to dissolve the co-monomer. The amount of solvent that can be used in the reaction medium may be in the range of 0 to 5 weight percent based on the total weight of the monomers employed. Any of the suitable solvents that dissolves the catalyst, activator and/or monomers can be employed in this invention. Examples of such solvents include alkanes, cycloalkane, toluene, THF, dichloromethane, dichloroethane, and the like.

Advantageously, it has now been found that one or more of the monomers themselves can be used to dissolve the latent catalyst as well as the activator and thus avoiding the need for the use of solvents. In addition, one monomer can itself serve as a solvent for the other monomer and thus eliminating the need for an additional solvent. For example, if first monomer of formula (I) is a solid at room temperature, then the second monomer of formula (I), which is liquid at room temperature can be used as a solvent for the first monomer of formula (I) which is a solid or vice versa. Therefore, in such situations more than one monomer can be employed in the composition of this invention.

Accordingly, it has now been surprisingly found that monomers of formula (I) serve as raw materials for fabricating a three dimensional (3D) objects using any of the known 3D technologies. In general, the composition of this invention exhibits low viscosity, which can be below 100 centipoise at 25° C. and in some embodiments below 50 centipoise (cP) at 25° C. In some embodiments, the viscosity of the composition of this invention is less than 40 centipoise at 25° C. In some other embodiments the viscosity of the composition of this invention is in the range from about 10 to 40 centipoise at 25° C. In yet some other embodiments the viscosity of the composition of this invention is lower than 30 cP, lower than 20 cP, lower than 15 cP, lower than 12 cP at 25° C. In some embodiments it may be lower than 10 cP at 40° C. In some embodiments the viscosity of the composition of this invention is in the range from about 8 to 12 cP at 40° C.

When the composition of this invention contains two or more monomers, for example, they can be present in any desirable amounts that would bring about the intended benefit, including viscosity modification or improvement in thermal and mechanical properties or both. Accordingly, the molar ratio of first monomer of formula (I) to second distinct monomer of formula (I) can be from 1:99 to 99:1. In some embodiments, the molar ratio of first monomer of formula (I):second distinct monomer of formula (I) is in the range from 5:95 to 95:5; in some other embodiments it is from 10:90 to 90:10; it is from 20:80 to 80:20; it is from 30:70 to 70:30; it is from 60:40 to 40:60; and it is 50:50, and so on. Similarly, when more than two different monomers of formula (I) are employed, any ratios of such monomers can be used that would bring about the intended result.

In general, the compositions in accordance with the present invention encompass the above described one or more of the monomer of formula (I) and if needed additional monomers of formula (I) distinct from each other, as it will be seen below, various composition embodiments are selected to provide properties to such embodiments that are appropriate and desirable for the use for which such embodiments are directed, thus such embodiments are tailorable to a variety of specific applications.

For example, as already discussed above, proper combination of distinctive monomers of formula (I) makes it possible to tailor a composition having the desirable viscosity, thermal and mechanical properties. In addition, as described further herein it may be desirable to include other polymeric or monomeric materials as additives, such as for example inorganic nanoparticles which are compatible to provide desirable optical properties depending upon the end use application. Accordingly, the compositions of this invention can also include other polymeric materials and/or nanoparticles which will bring about such intended benefit. Examples of such polymers include without any limitation, polystyrene, poly(α-methylstyrene), poly(vinyl-toluene), copolymers of α-methylstyrene and vinyl-toluene, and the like. Other polymers that may be suitable as additives in the compositions of this invention include elastomeric polymers, including a wide variety of rubbers, both natural and synthetic rubber. Non-limiting examples of synthetic rubbers include polyisobutylene (PIB), polybutadiene, polyisoprene, random and block copolymers of butadiene and/or isoprene with styrene, styrene-butadiene rubbers (SBR), chloroprene rubbers, and the like. In some embodiments certain of these polymers and/or nanoparticles also function as viscosity modifiers depending upon the type of monomers employed. Accordingly, in some embodiments of this invention polystyrene is used as viscosity modifier.

The compositions in accordance with the present invention may further contain optional additives as may be useful for the purpose of improving properties of both the composition and the resulting object made therefrom. Such optional additives for example may include anti-oxidants and synergists. Any of the anti-oxidants that would bring about the intended benefit can be used in the compositions of this invention. Non-limiting examples of such antioxidants include pentaerythritol tetrakis(3-(3,5-di-tert-butyl-4-hydroxyphenyl)propionate) (IRGANOX™ 1010 from BASF), 3,5-bis(1,1-dimethylethyl)-4-hydroxy-octadecyl ester benzenepropanoic acid (IRGANOX™ 1076 from BASF) and thiodiethylene bis[3-(3,5-di-tert.-butyl-4-hydroxy-phenyl)propionate] (IRGANOX™ 1035 from BASF). Non-limiting examples of such synergists include certain of the secondary antioxidants which may provide additional benefits such as for example prevention of autoxidation and thereby degradation of the composition of this invention and extending the performance of primary anti-oxidants, among other benefits. Examples of such synergists include, tris(2,4-ditert-butylphenyl)phosphite, commercially available as IRGAFOS 168 from BASF, among others.

Advantageously, it has further been found that the compositions of this invention can also contain additional monomers. In some embodiments, the composition according to this invention may further contain one or more second monomer selected from the monomer of formula (IV).

In this aspect of the invention, it has now been found that monomer of formula (IV) provides further advantages. Namely, the monomer of formula (IV) depending upon the nature of the monomer may impart high thermo-mechanical properties, thus it can be tailored to meet the need. In addition, the monomer of formula (IV) may exhibit low viscosity and good solubility for the latent catalyst and/or activator, among various other advantages.

Again, any amount of monomer of formula (I) with a monomer of formula (IV), if needed, can be employed to form the compositions of this invention. Accordingly, the molar ratio of monomer of formula (I) to monomer of formula (IV) can be from 0:100 to 100:0 or from 1:99 to 99:1. In some embodiments, the molar ratio of monomer of formula (I):monomer of formula (IV) is in the range from 5:95 to 95:5; in some other embodiments it is from 10:90 to 90:10; it is from 20:80 to 80:20; it is from 30:70 to 70:30; it is from 60:40 to 40:60; and it is 50:50, and so on. Similarly, when more than one monomer of formula (I) and more than one monomer of formula (IV) are employed, any ratios of such monomers can be used that would bring about the intended result.

In some embodiments the composition according to this invention encompasses a monomer of formula (I) wherein m is 1 and each of $R_1$, $R_2$, $R_3$ and $R_4$ are hydrogen. In some other embodiments the composition according to this invention encompasses a monomer of formula (I) wherein m is 0 and at least one of $R_1$, $R_2$, $R_3$ and $R_4$ is other than hydrogen and is a group as defined above and the remaining $R_1$, $R_2$, $R_3$ and $R_4$ are hydrogen.

In some embodiments the composition according to this invention encompasses a monomer of formula (IV) where $R_{18}$ is hydrogen. In some embodiments the composition according to this invention encompasses a monomer of formula (IV) where $R_{18}$ is methyl, ethyl, n-propyl, iso-propyl, n-butyl, iso-butyl, tert-butyl, phenyl, benzyl, phenethyl, methoxy, ethoxy, phenoxy, benzyloxy, acetoxy and benzoyl.

In some embodiments the composition of this invention encompasses first and second monomer of formula (I) distinct from each other, wherein said first monomer is of formula (I) wherein m is 1 and each of $R_1$, $R_2$, $R_3$ and $R_4$ are hydrogen; and wherein said second monomer is of formula (I) wherein m is 0, $R_1$ is decyl and each of $R_2$, $R_3$ and $R_4$ are hydrogen.

Accordingly, any of the monomers within the scope of monomer of formula (I) can be employed in the composition of the invention. Representative examples of monomer of formula (I) include the following without any limitations:

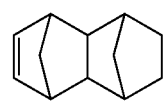 [SMILES: C1=CC2CC1C1C3CCC(C3)C21]

tetracyclododecene (TD);

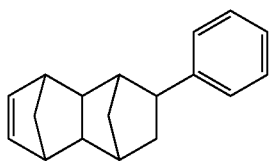 [SMILES: C1=CC2CC1C1C3CC(c4ccccc4)C(C3)C21]

2-phenyl-tetracyclododecene (PhTD);

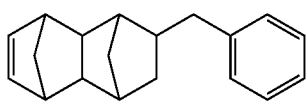 [SMILES: C1=CC2CC1C1C3CC(Cc4ccccc4)C(C3)C21]

2-benzyl-1,2,3,4,4a,5,8,8a-octahydro-1,4:5,8-dimethanon-
aphthalene;

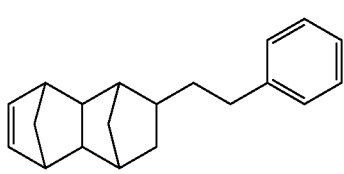 [SMILES: C1=CC2CC1C1C3CC(CCc4ccccc4)C(C3)C21]

2-phenethyl-1,2,3,4,4a,5,8,8a-octahydro-1,4:5,8-dimetha-
nonaphthalene (PETD);

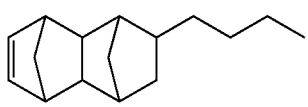 [SMILES: CCCCC1CC2CC1C1C3C=CC(C3)C21]

2-butyl-1,2,3,4,4a,5,8,8a-octahydro-1,4:5,8-dimethanon-
aphthalene (ButylTD);

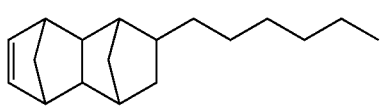 [SMILES: CCCCCCC1CC2CC1C1C3C=CC(C3)C21]

2-hexyl-1,2,3,4,4a,5,8,8a-octahydro-1,4:5,8-dimethanon-
aphthalene (HexylTD);

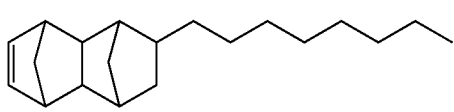 [SMILES: CCCCCCCCC1CC2CC1C1C3C=CC(C3)C21]

2-octyl-1,2,3,4,4a,5,8,8a-octahydro-1,4:5,8-dimethanon-
aphthalene (OctylTD);

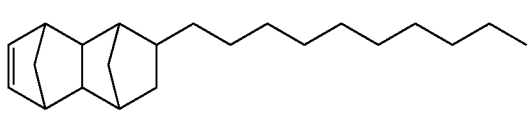 [SMILES: CCCCCCCCCCC1CC2CC1C1C3C=CC(C3)C21]

2-decyl-1,2,3,4,4a,5,8,8a-octahydro-1,4:5,8-dimethanon-
aphthalene (DecylTD);

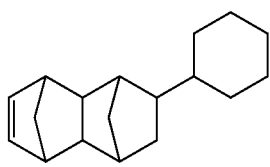 [SMILES: C1=CC2CC1C1C3CC(C4CCCCC4)C(C3)C21]

2-cyclohexyl-tetracyclododecene (CyclohexylTD);

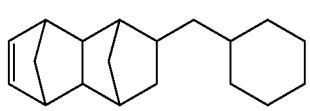 [SMILES: C1=CC2CC1C1C3CC(CC4CCCCC4)C(C3)C21]

2-cyclohexylmethyl-1,2,3,4,4a,5,8,8a-octahydro-1,4:5,8-di-
methanonaphthalene;

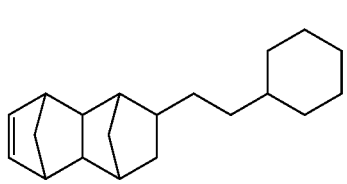 [SMILES: C1=CC2CC1C1C3CC(CCC4CCCCC4)C(C3)C21]

2-cyclohexylethyl-1,2,3,4,4a,5,8,8a-octahydro-1,4:5,8-di-
methanonaphthalene;

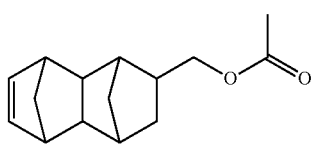 [SMILES: CC(=O)OCC1CC2CC1C1C3C=CC(C3)C21]

(1,2,3,4,4a,5,8,8a-octahydro-1,4:5,8-dimethanonaphthalen-
2-yl)methyl acetate (TDMeOAc);

tetracyclododecadiene (TDD);

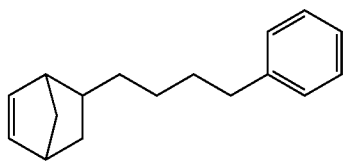 [SMILES: C1=CC2CC1CC2CCCCc1ccccc1]

5-(4-phenylbutyl)bicyclo[2.2.1]hept-2-ene;

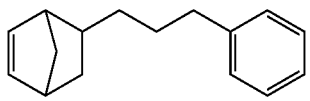 [SMILES: C1=CC2CC1CC2CCCc1ccccc1]

5-(3-phenylpropyl)bicyclo[2.2.1]hept-2-ene;

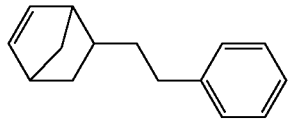 [SMILES: C1=CC2CC1CC2CCc1ccccc1]

5-phenethylbicyclo[2.2.1]hept-2-ene (PENB);

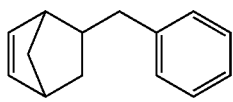 [SMILES: C1=CC2CC1CC2Cc1ccccc1]

5-benzylbicyclo[2.2.1]hept-2-ene;

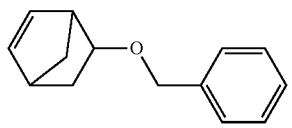

5-(benzyloxy)bicyclo[2.2.1]hept-2-ene;

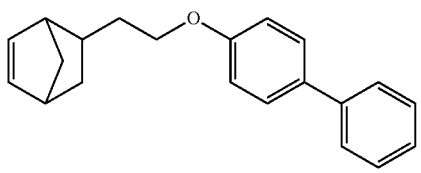 [SMILES: C1=CC2CC1CC2CCOc1ccc(-c2ccccc2)cc1]

5-(2-([1,1'-biphenyl]-4-yloxy)ethyl)bicyclo[2.2.1]hept-2-ene;

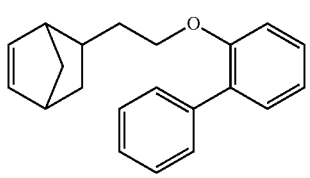 [SMILES: C1=CC2CC1CC2CCOc1ccccc1-c1ccccc1]

5-(2-([1,1'-biphenyl]-2-yloxy)ethyl)bicyclo[2.2.1]hept-2-ene (NBEtO-2-PhPh);

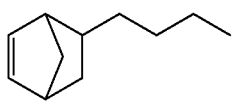

5-butylbicyclo[2.2.1]hept-2-ene (BuNB);

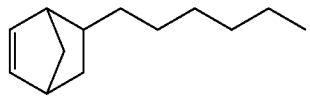

5-hexylbicyclo[2.2.1]hept-2-ene (HexylNB);

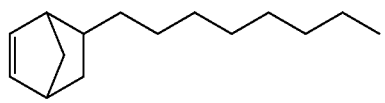

5-octylbicyclo[2.2.1]hept-2-ene (OctNB);

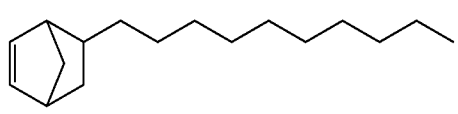

5-decylbicyclo[2.2.1]hept-2-ene (DecylNB);

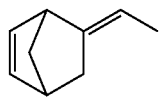

5-ethylidenebicyclo[2.2.1]hept-2-ene;

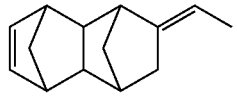

2-ethylidene-1,2,3,4,4a,5,8,8a-octahydro-1,4:5,8-dimethanonaphthalene;

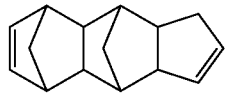 [SMILES: C1=CC2C(C1)C1CC2C2C3C=CC(C3)C12]

3a,4,4a,5,8,8a,9,9a-octahydro-1H-4,9:5,8-dimethanocyclopenta[b]naphthalene (one of trimers of cyclopentadiene, TCPD1, also known as CPD3);

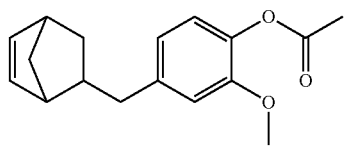 [SMILES: COc1cc(CC2CC3C=CC2C3)ccc1OC(C)=O]

5-norbornenylmethyleugenyl acetate (EuAcNB);

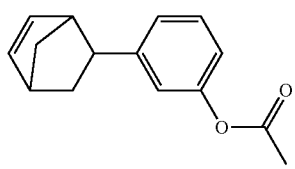 [SMILES: CC(=O)Oc1cccc(C2CC3C=CC2C3)c1]

3-(bicyclo[2.2.1]hept-5-en-2-yl)phenyl acetate (PhAcNB);

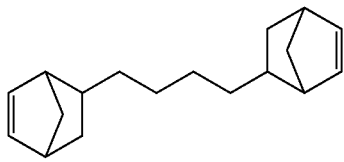 [SMILES: C1=CC2CC1CC2CCCCC1CC2C=CC1C2]

1,4-di(bicyclo[2.2.1]hept-5-en-2-yl)butane (NBBuNB); and

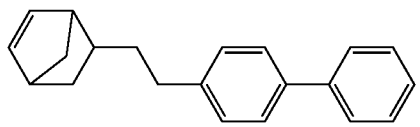 [SMILES: C1=CC2CC1CC2CCc1ccc(-c2ccccc2)cc1]

5-(2-([1,1'-biphenyl]-4-yl)ethyl)bicyclo[2.2.1]hept-2-ene (NBEtPhPh).

Representative examples of monomer of formula (IV) include the following without any limitations:

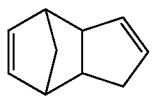

dicyclopentadiene (DCPD);

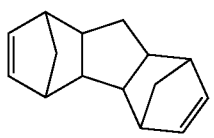 [SMILES: C1=CC2CC1C1CC3C4C=CC(C4)C3C21]

4,4a,4b,5,8,8a,9,9a-octahydro-1H-1,4:5,8-dimethanofluorene (one of trimers of cyclopentadiene, TCPD2);

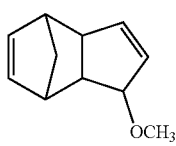

1-methoxy-dicyclopentadiene;

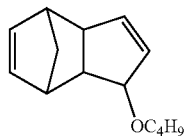

1-(n-butoxy)-dicyclopentadiene;

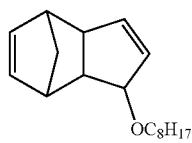

1-(n-octyloxy)-dicyclopentadiene;

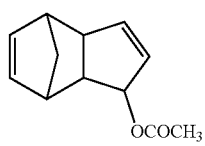

3a,4,7,7a-tetrahydro-1H-4,7-methanoinden-1-yl acetate;

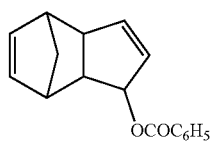

3a,4,7,7a-tetrahydro-1H-4,7-methanoinden-1-yl benzoate;

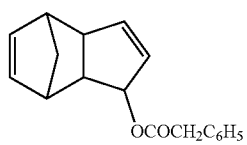

3a,4,7,7a-tetrahydro-1H-4,7-methanoinden-1-yl 2-phenylacetate; and

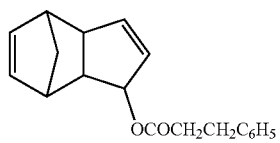

3a,4,7,7a-tetrahydro-1H-4,7-methanoinden-1-yl 3-phenylpropanoate.

In addition, the composition of this invention contains optionally at least one or more compounds of formulae (VIIa), (VIIb) or (VIIc). Advantageously, it has now been found that incorporating one or more compounds of formulae (VIIa), (VIIb) or (VIIc) it is possible to tailor the properties of the compositions for the intended purpose. For example, suitable combination of one or more compounds of formulae (VIIa), (VIIb) or (VIIc) with the composition of this invention it is now possible to improve the mechanical properties of the articles formed from the composition of this invention among other properties. More particularly it has now been found that incorporation of certain siloxane compounds within the scope of compounds of formulae (VIIa) or (VIIb) improves the impact strength of the products formed therefrom. Any amount of one or more compounds of formula (VIIa), (VIIb) or (VIIc) can be employed that would bring about the intended benefit. In general such amounts may range from 0 to 20 mole percent of compounds of formulae (VIIa), (VIIb) and (VIIc) based upon the total moles of compounds of formulae (I), (IV), (VIIa), (VIIb) and (VIIc). In some embodiments such amounts may range from 1 to 15 mole percent, and in some other embodiments such amounts may range from 1.5 to 10 mole percent.

Accordingly, in some embodiments the impact strength of the polymers formed from the composition of this invention is at least 40 J/m. In some other embodiments the impact strength of the polymers formed from the composition of this invention is at least 60 J/m. In yet some other embodiments the impact strength of the polymers formed from the composition of this invention is at least 80 J/m, 100 J/m or higher, 140 J/m or higher or it can be higher than 160 J/m, such as for example higher than 170 J/m, higher than 180 J/m, higher than 200, 220 or 240 J/m, or even higher than 500, 550, 600, 700 or 800 J/m depending upon the types of monomers employed as described herein.

In some embodiments the compounds of formulae (VIIa), (VIIb) or (VIIc) are each having m=0 and K=CH$_2$. In some embodiments the compounds of formulae (VIIa), (VIIb) or (VIIc) are each having m=1 and K=CH$_2$. In yet some other embodiments the compounds of formulae (VIIa), (VIIb) or (VIIc) are each having m=2 and K=CH$_2$.

Representative examples of compounds within the scope of formulae (VIIa) or (VIIb) without any limitation includes the following:

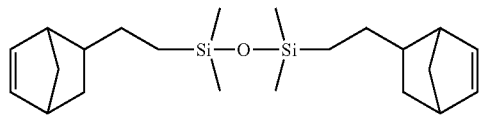 [SMILES: C[Si](C)(CCC1CC2C=CC1C2)O[Si](C)(C)CCC1CC2C=CC1C2]

1,3-bis(2-(bicyclo[2.2.1]hept-5-en-2-yl)ethyl)-1,1,3,3-tetramethyldisiloxane (BisENBTMDS);

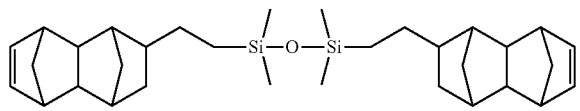 [SMILES: C[Si](C)(CCC1CC2CC1C1C3C=CC(C3)C21)O[Si](C)(C)CCC1CC2CC1C1C3C=CC(C3)C21]

1,1,3,3-tetramethyl-1,3-bis(2-(1,2,3,4,4a,5,8,8a-octahydro-1,4:5,8-dimethanonaphthalen-2-yl)ethyl)disiloxane;

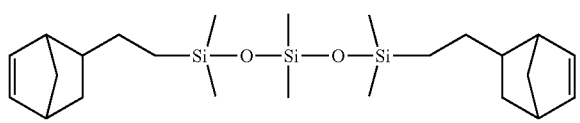 [SMILES: C[Si](C)(CCC1CC2C=CC1C2)O[Si](C)(C)O[Si](C)(C)CCC1CC2C=CC1C2]

1,5-bis(2-(bicyclo[2.2.1]hept-5-en-2-yl)ethyl)-1,1,3,3,5,5-hexamethyltrisiloxane (BisENBHMTS);

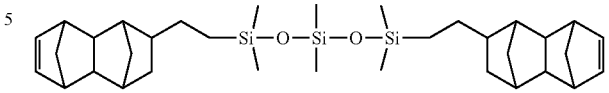

1,1,3,3,5,5-hexamethyl-1,5-bis(2-(1,2,3,4,4a,5,8,8a-octahydro-1,4:5,8-dimethanonaphthalen-2-yl)ethyl)trisiloxane;

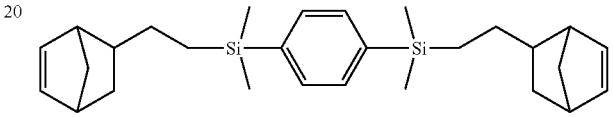

1,4-bis((2-(bicyclo[2.2.1]hept-5-en-2-yl)ethyl)dimethylsilyl)benzene;

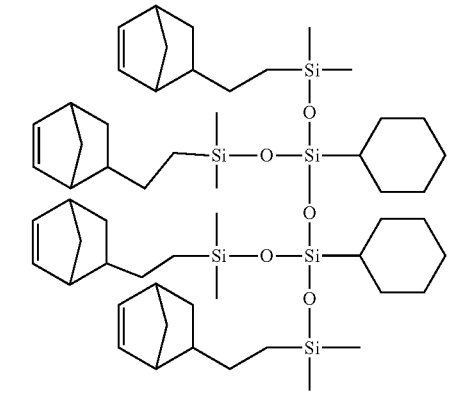 [SMILES: C[Si](C)(CCC1CC2C=CC1C2)O[Si](O[Si](C)(C)CCC1CC2C=CC1C2)(O[Si](O[Si](C)(C)CCC1CC2C=CC1C2)(O[Si](C)(C)CCC1CC2C=CC1C2)C1CCCCC1)C1CCCCC1]

3,3'-oxybis(1,5-bis(2-(bicyclo[2.2.1]hept-5-en-2-yl)ethyl)-3-cyclohexyl-1,1,5,5-tetramethyltrisiloxane) (TeTENBOMSS);

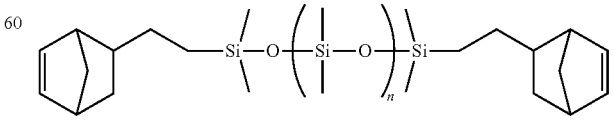

(bicycloheptenyl)ethyl terminated polydimethylsiloxane, where n is 2 to 4; and

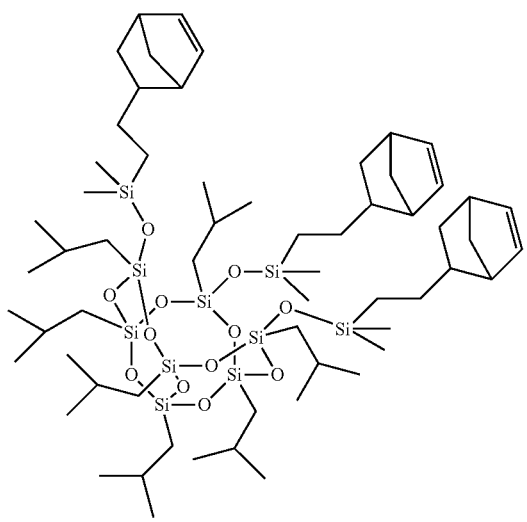 [SMILES: CC(C)C[Si]1(O[Si](C)(C)CCC2CC3C=CC2C3)O[Si]2(CC(C)C)O[Si](CC(C)C)(O[Si](C)(C)CCC3CC4C=CC3C4)O[Si]3(CC(C)C)O[Si](CC(C)C)(O[Si](C)(C)CCC4CC5C=CC4C5)O[Si](CC(C)C)(O1)O[Si](CC(C)C)(O2)O3]

3,7,14-tris(((2-(bicyclo[2.2.1]hept-5-en-2-yl)ethyl)dimethylsilyl)oxy)-1,3,5,7,9,11,14-heptaisobutyl-2,4,6,8,10,12,13,15,16-nonaoxa-1,3,5,7,9,11,14-heptasilatricyclo[7.3.3.1⁵,¹¹]hexadecane (trisnorbornenylisobutyl POSS).

In addition various other oligomeric or polymeric polysiloxanes with multi-functional cycloolefinic pendent groups are suitable as crosslinking molecules in the composition of this invention which may or may not be within the scope of compound of formula (VIIa). Such examples include an oligomeric siloxane of the formula:

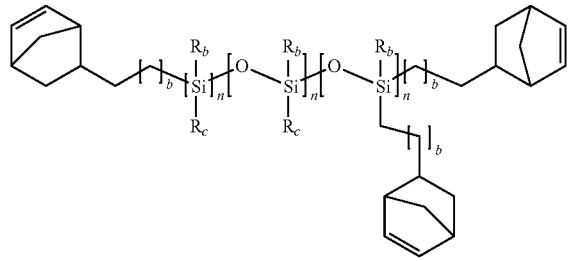

Where b is an integer from 1 to 9;

n is an integer from 1 to 10; and $R_b$ and $R_c$ are independently selected from the group consisting of methyl, ethyl, n-propyl, iso-propyl, n-butyl, isobutyl and phenyl.

Various other non-limiting examples of the compounds of formulae (VIIa), (VIIb) or (VIIc) maybe selected from the group consisting of:

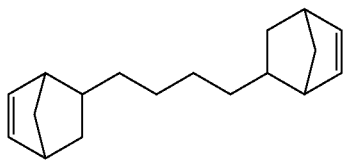 [SMILES: C1=CC2CC1CC2CCCCC1CC2C=CC1C2]

1,4-di(bicyclo[2.2.1]hept-5-en-2-yl)butane;

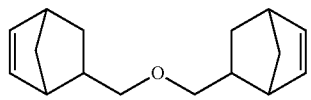 [SMILES: C1=CC2CC1CC2COCC1CC2C=CC1C2]

5,5'-(oxybis(methylene))bis(bicyclo[2.2.1]hept-2-ene);

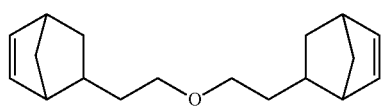 [SMILES: C1=CC2CC1CC2CCOCCC1CC2C=CC1C2]

5,5'-(oxybis(ethane-2,1-diyl))bis(bicyclo[2.2.1]hept-2-ene);

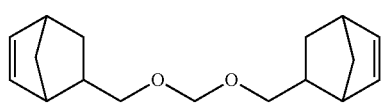 [SMILES: C1=CC2CC1CC2COCOCC1CC2C=CC1C2]

bis(bicyclo[2.2.1]hept-5-en-2-ylmethoxy)methane;

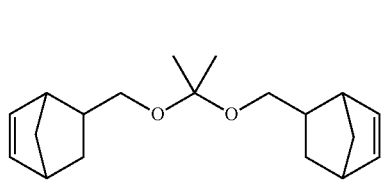 [SMILES: CC(C)(OCC1CC2C=CC1C2)OCC1CC2C=CC1C2]

5,5'-((propane-2,2-diylbis(oxy))bis(methylene))bis(bicyclo[2.2.1]hept-2-ene);

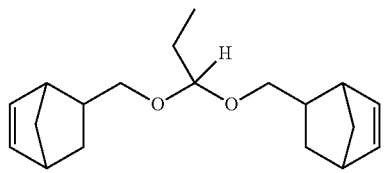 [SMILES: CCC(OCC1CC2C=CC1C2)OCC1CC2C=CC1C2]

5,5'-((propane-1,1-diylbis(oxy))bis(methylene))bis(bicyclo[2.2.1]hept-2-ene);

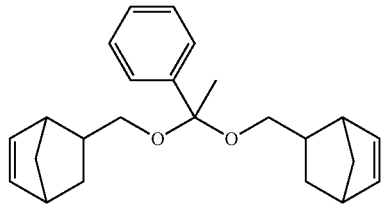 [SMILES: CC(OCC1CC2C=CC1C2)(OCC1CC2C=CC1C2)c1ccccc1]

5,5'-(((1-phenylethane-1,1-diyl)bis(oxy))bis(methylene))bis(bicyclo[2.2.1]hept-2-ene);

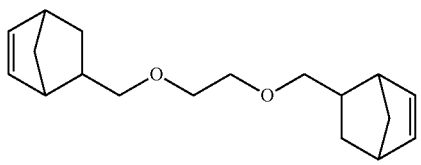 [SMILES: C1=CC2CC1CC2COCCOCC1CC2C=CC1C2]

1,2-bis(bicyclo[2.2.1]hept-5-en-2-ylmethoxy)ethane;

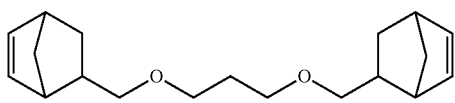 [SMILES: C1=CC2CC1CC2COCCCOCC1CC2C=CC1C2]

1,3-bis(bicyclo[2.2.1]hept-5-en-2-ylmethoxy)propane;

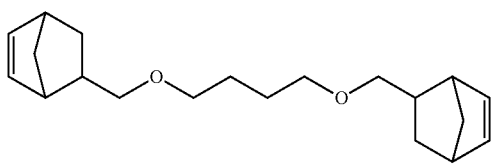 [SMILES: C1=CC2CC1CC2COCCCCOCC1CC2C=CC1C2]

1,4-bis(bicyclo[2.2.1]hept-5-en-2-ylmethoxy)butane;

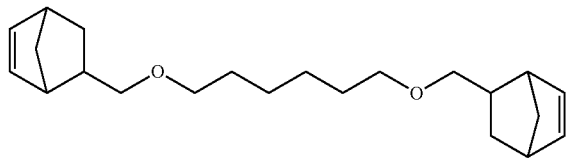 [SMILES: C1=CC2CC1CC2COCCCCCCOCC1CC2C=CC1C2]

1,6-bis(bicyclo[2.2.1]hept-5-en-2-ylmethoxy)hexane;

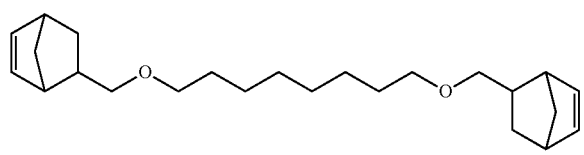 [SMILES: C1=CC2CC1CC2COCCCCCCCCOCC1CC2C=CC1C2]

1,8-bis(bicyclo[2.2.1]hept-5-en-2-ylmethoxy)octane;

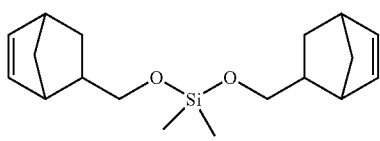 [SMILES: C[Si](C)(OCC1CC2C=CC1C2)OCC1CC2C=CC1C2]

bis(bicyclo[2.2.1]hept-5-en-2-ylmethoxy)dimethylsilane;

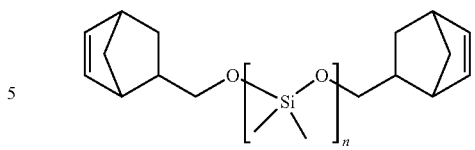

where n is 2 to 4;

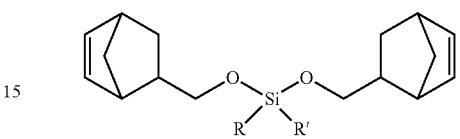

Where R and R' are independently selected from ($C_1$-$C_{12}$alkyl), ($C_6$-$C_{10}$aryl) and ($C_6$-$C_{10}$aryl)($C_1$-$C_{12}$alkyl);

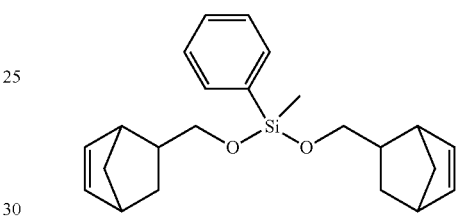

bis(bicyclo[2.2.1]hept-5-en-2-ylmethoxy)(methyl)(phenyl)silane;

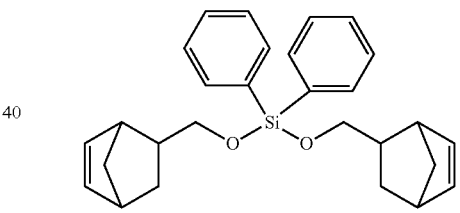

bis(bicyclo[2.2.1]hept-5-en-2-ylmethoxy)diphenylsilane;

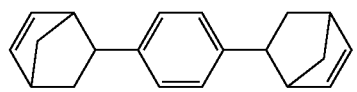 [SMILES: C1=CC2CC1CC2c1ccc(C2CC3C=CC2C3)cc1]

1,4-di(bicyclo[2.2.1]hept-5-en-2-yl)benzene;

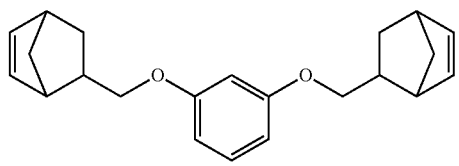 [SMILES: C1=CC2CC1CC2COc1cccc(OCC2CC3C=CC2C3)c1]

1,3-bis(bicyclo[2.2.1]hept-5-en-2-ylmethoxy)benzene;

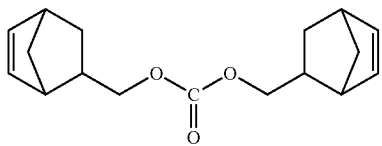 [SMILES: O=C(OCC1CC2C=CC1C2)OCC1CC2C=CC1C2]
bis(bicyclo[2.2.1]hept-5-en-2-ylmethyl) carbonate;
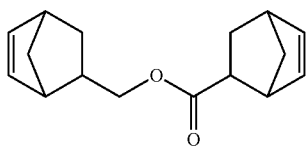 [SMILES: O=C(OCC1CC2C=CC1C2)C1CC2C=CC1C2]
bicyclo[2.2.1]hept-5-en-2-ylmethyl bicyclo[2.2.1]hept-5-ene-2-carboxylate;
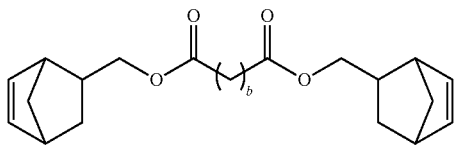
Where b is an integer from 1 to 6;
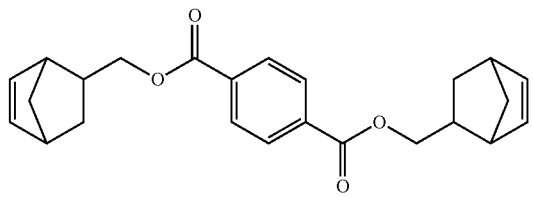 [SMILES: O=C(OCC1CC2C=CC1C2)c1ccc(C(=O)OCC2CC3C=CC2C3)cc1]
bis(bicyclo[2.2.1]hept-5-en-2-ylmethyl) terephthalate;
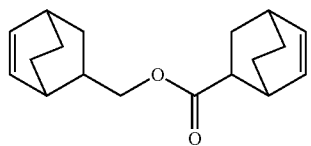 [SMILES: O=C(OCC1CC2C=CC1CC2)C1CC2C=CC1CC2]
bicyclo[2.2.2]oct-5-en-2-ylmethyl bicyclo[2.2.2]oct-5-ene-2-carboxylate;
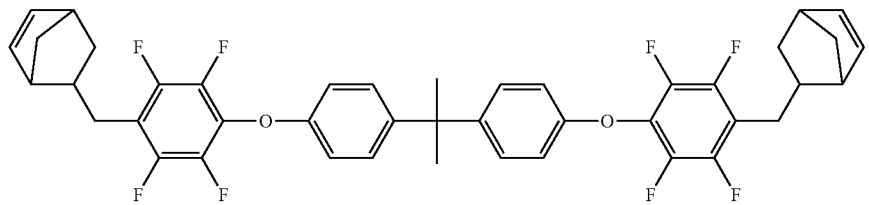 [SMILES: CC(C)(c1ccc(Oc2c(F)c(F)c(CC3CC4C=CC3C4)c(F)c2F)cc1)c1ccc(Oc2c(F)c(F)c(CC3CC4C=CC3C4)c(F)c2F)cc1]
5,5'-(((((propane-2,2-diylbis(4,1-phenylene))bis(oxy))bis(2,3,5,6-tetrafluoro-4,1-phenylene))bis(methylene))bis(bicyclo[2.2.1]hept-2-ene);
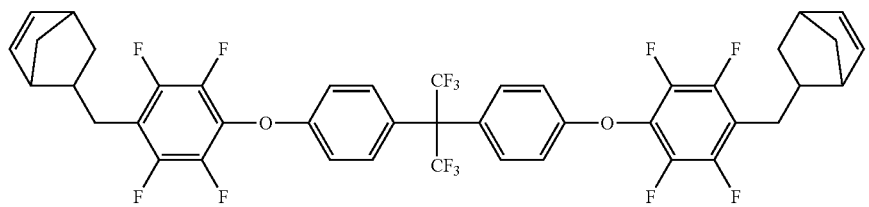 [SMILES: Fc1c(F)c(Oc2ccc(C(c3ccc(Oc4c(F)c(F)c(CC5CC6C=CC5C6)c(F)c4F)cc3)(C(F)(F)F)C(F)(F)F)cc2)c(F)c(F)c1CC1CC2C=CC1C2]

5,5'-(((((perfluoropropane-2,2-diyl)bis(4,1-phenylene))bis(oxy))bis(2,3,5,6-tetrafluoro-4,1-phenylene))bis(methylene))bis(bicyclo[2.2.1]hept-2-ene)

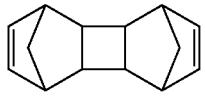 [SMILES: C1=CC2CC1C1C2C2C3C=CC(C3)C12]

1,4,4a,4b,5,8,8a,8b-octahydro-1,4:5,8-dimethanobiphenylene;

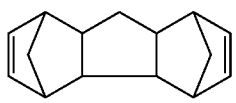 [SMILES: C1=CC2CC1C1CC3C4C=CC(C4)C3C21]

4,4a,4b,5,8,8a,9,9a-octahydro-1H-1,4:5,8-dimethanofluorene;

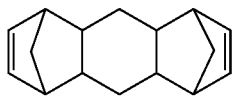 [SMILES: C1=CC2CC1C1CC3C4C=CC(C4)C3CC21]

1,4,4a,5,8,8a,9,9a,10,10a-decahydro-1,4:5,8-dimethanoanthracene;

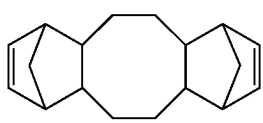 [SMILES: C1=CC2CC1C1CCC3C4C=CC(C4)C3CCC21]

1,4,4a,5,6,6a,7,10,10a,11,12,12a-dodecahydro-1,4:7,10-dimethanodibenzo[a,e][8]annulene; and

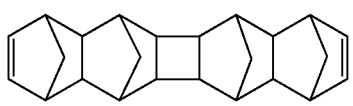 [SMILES: C1=CC2CC1C1C3CC(C21)C1C3C2C3CC(C4C5C=CC(C5)C34)C12]

1,4,4a,5,5a,5b,6,6a,7,10,10a,11,11a,11b,12,12a-hexadecahydro-1,4:5,12:6,11:7,10-tetramethanodibenzo[b,h]biphenylene.

Various other non-limiting examples within the scope of the compounds of formula (VIIa), (VIIb) and (VIIc) maybe enumerated as follows:

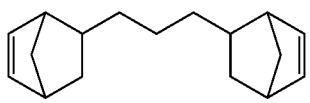 [SMILES: C1=CC2CC1CC2CCCC1CC2C=CC1C2]

1,3-di(bicyclo[2.2.1]hept-5-en-2-yl)propane;

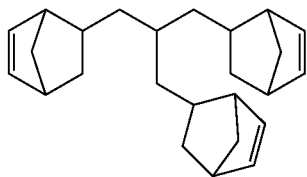 [SMILES: C1=CC2CC1CC2CC(CC1CC2C=CC1C2)CC1CC2C=CC1C2]

5,5'-(2-(bicyclo[2.2.1]hept-5-en-2-ylmethyl)propane-1,3-diyl)bis(bicyclo[2.2.1]hept-2-ene);

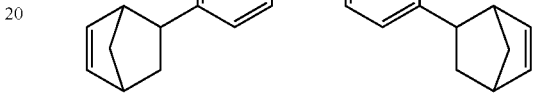

bis(4-(bicyclo[2.2.1]hept-5-en-2-yl)phenyl)methane;

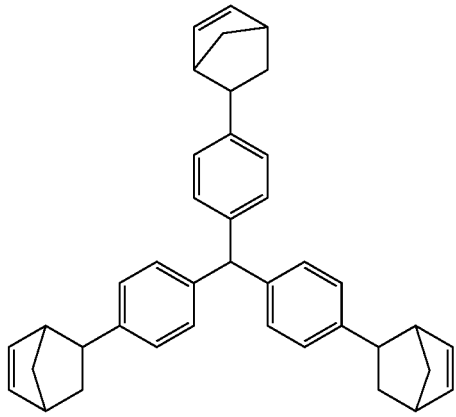 [SMILES: C1=CC2CC1CC2c1ccc(C(c2ccc(C3CC4C=CC3C4)cc2)c2ccc(C3CC4C=CC3C4)cc2)cc1]

tris(4-(bicyclo[2.2.1]hept-5-en-2-yl)phenyl)methane;

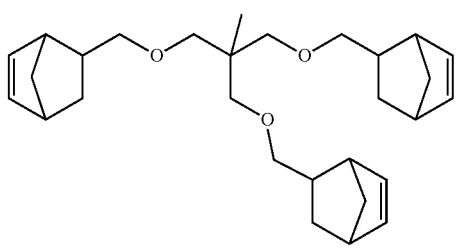 [SMILES: CC(COCC1CC2C=CC1C2)(COCC1CC2C=CC1C2)COCC1CC2C=CC1C2]

5,5'-(((2-((bicyclo[2.2.1]hept-5-en-2-ylmethoxy)methyl)-2-methylpropane-1,3-diyl)bis(oxy))bis(methylene))bis(bicyclo[2.2.1]hept-2-ene);

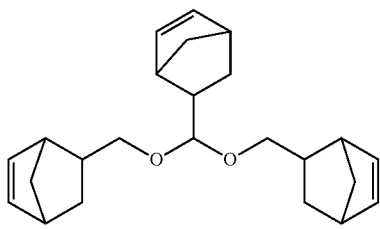 [SMILES: C1=CC2CC1CC2COC(OCC1CC2C=CC1C2)C1CC2C=CC1C2]

5,5'-(((bicyclo[2.2.1]hept-5-en-2-ylmethylene)bis(oxy))bis(methylene))bis(bicyclo[2.2.1]hept-2-ene);

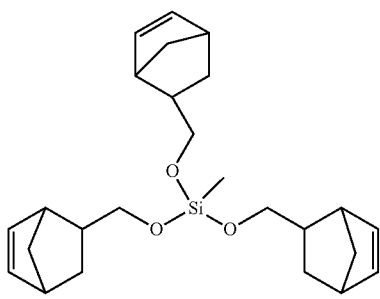 [SMILES: C[Si](OCC1CC2C=CC1C2)(OCC1CC2C=CC1C2)OCC1CC2C=CC1C2]

tris(bicyclo[2.2.1]hept-5-en-2-ylmethoxy)(methyl)silane; and

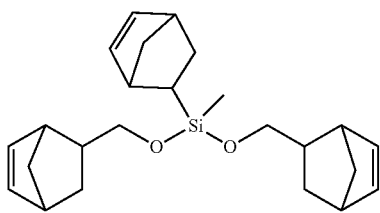 [SMILES: C[Si](OCC1CC2C=CC1C2)(OCC1CC2C=CC1C2)C1CC2C=CC1C2]

bicyclo[2.2.1]hept-5-en-2-ylbis(bicyclo[2.2.1]hept-5-en-2-ylmethoxy)(methyl)silane.

In some embodiments the composition of this invention encompasses one or more monomer of formula (I), which is selected from the group consisting of:
tetracyclododecene (TD);
2-phenethyl-1,2,3,4,4a,5,8,8a-octahydro-1,4:5,8-dimethanonaphthalene (PETD);
2-hexyl-1,2,3,4,4a,5,8,8a-octahydro-1,4:5,8-dimethanonaphthalene (HexylTD);
2-decyl-1,2,3,4,4a,5,8,8a-octahydro-1,4:5,8-dimethanonaphthalene (DecylTD);
3a,4,4a,5,8,8a,9,9a-octahydro-1H-4,9:5,8-dimethanocyclopenta[b]naphthalene (CPD3);
5-butylbicyclo[2.2.1]hept-2-ene (BuNB);
5-hexylbicyclo[2.2.1]hept-2-ene (HexylNB);
5-decylbicyclo[2.2.1]hept-2-ene (DecylNB);
5-phenethylbicyclo[2.2.1]hept-2-ene (PENB);
5-(2-([1,1'-biphenyl]-4-yloxy)ethyl)bicyclo[2.2.1]hept-2-ene; and
5-(2-([1,1'-biphenyl]-2-yloxy)ethyl)bicyclo[2.2.1]hept-2-ene (NBEtO-2-PhPh).

In some embodiments the composition of this invention further includes a monomer of formula (IV), which is dicyclopentadiene (DCPD). It should be noted that mixtures in any combination of aforementioned monomers of formula (I) and monomers of formula (IV) can be employed in the compositions of this invention so as to obtain the intended benefit for forming the desirable 3D objects and can be tailored in accordance with the properties required for the formation of such 3D objects.

In a further embodiment of this invention, the composition contains any of the latent catalyst that would bring about the mass polymerization as described herein under ROMP conditions. Generally, such suitable latent catalysts include a number of known organo-transition metal complexes, such as organo-ruthenium or organo-osmium compounds, among others. For example, U.S. Pat. No. 9,328,132 B2, pertinent portions of which are incorporated herein, discloses a series of organo-ruthenium compounds, which are pre-catalysts for the olefin metathesis reactions, all of such catalysts may be suitable as latent catalysts in the compositions of this invention.

Accordingly, the composition of this invention encompasses a latent catalyst which is an organo-ruthenium compound selected from the group consisting of compounds of formulae (IIA), (IIB), (IIIA), (IIIB) and (IIIC):

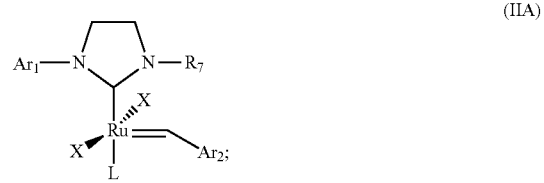
(IIA)

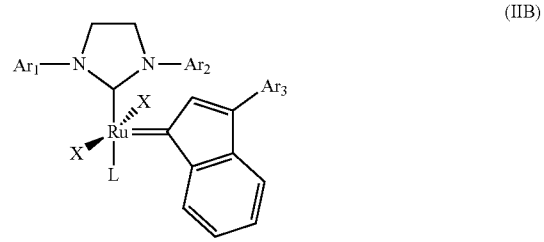
(IIB)

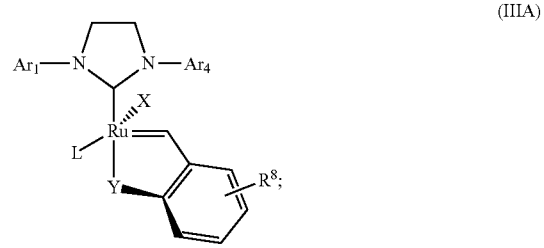
(IIIA)

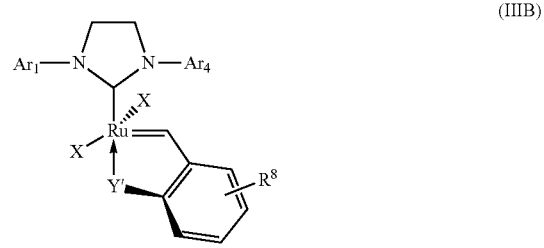
(IIIB)

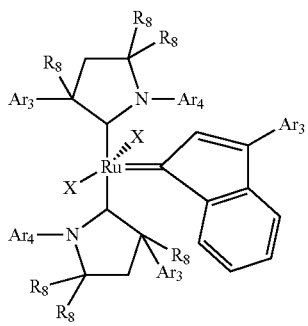

(IIIC)

and
wherein:
X is a halogen or an anionic ligand;
Y is selected from the group consisting of O and S;
Y' is OR$_9$, SR$_9$ and —N=CHC(O)O(C$_1$-C$_6$)alkyl, where R$_9$ is selected from the group consisting of methyl, ethyl, linear or branched (C$_1$-C$_6$)alkyl, (C$_6$-C$_{10}$)aryl, methoxy, ethoxy, linear or branched (C$_1$-C$_6$)alkoxy, (C$_6$-C$_{10}$)aryloxy, —OCH(CH$_3$)C(O)N(CH$_3$)(OCH$_3$);
L is PR$_3$ or O=PR$_3$, where R is independently selected from the group consisting of isopropyl, sec-butyl, tert-butyl, cyclohexyl, bicyclo(C$_5$-C$_{10}$)alkyl, phenyl, benzyl, isopropoxy, sec-butoxy, tert-butoxy, cyclohexyloxy, phenoxy and benzyloxy; or
X and L form a bidentate anionic ligand of the formula X-L;
R$_7$ is selected from the group consisting of isopropyl, sec-butyl, tert-butyl, substituted or unsubstituted cyclohexyl, substituted or unsubstituted phenyl, substituted or unsubstituted biphenyl and substituted or unsubstituted naphthyl;
R$_8$ is selected from the group consisting of methyl, ethyl, linear or branched (C$_1$-C$_6$)alkyl, (C$_6$-C$_{10}$)aryl, methoxy, ethoxy, linear or branched (C$_1$-C$_6$)alkoxy, (C$_6$-C$_{10}$) aryloxy, —NHCO(C$_1$-C$_6$)alkyl, —NHCO-perfluoro(C$_1$-C$_6$)alkyl, —SO$_2$N((C$_1$-C$_6$)alkyl)$_2$ and —NO$_2$;
Ar$_1$, Ar$_2$ Ar$_3$ and Ar$_4$ are the same or different and each independently selected from the group consisting of substituted or unsubstituted phenyl, substituted or unsubstituted biphenyl and substituted or unsubstituted naphthyl;
wherein said substituents are selected from the group consisting of methyl, ethyl, iso-propyl, tert-butyl and phenyl.

It should be noted that in the above formulae (IIA), (IIB), (IIIA), (IIIB) and (IIIC), X can include any of the halogens. In some embodiments X is chlorine, bromine and iodine.

Generally, any of the latent organo-transition metal catalyst that would bring about ring open metathesis polymerization of the monomers of formula (I) and monomers of formula (IV), if present, can be employed in the composition of this invention. More specifically, organo-ruthenium or organo-osmium compounds that show little or no activity at ambient temperatures can be employed. That is, the latent catalysts that are stable at or near room temperature are more suitable in the composition of this invention. The latent catalysts may be activated by a variety of conditions, including without any limitation acid and chemical activation. The chemical activation may include use of thermal acid generators or photo acid generators.

Several of the latent catalysts that are suitable to be employed in the compositions of this invention are known in the literature or can be readily made by any of the known procedures in the art. See for example, Grubbs, et al., Organometallics, 2011, 30 (24): 6713-6717; Sutar et al., Angew. Chem. Int. Ed. 2016, 55, 764-767; Leitgeh, et al., Monatsh Chem (2014) 145:1513-1517; van Hensbergen, et al., J. Mater. Chem. C. 2015, 3, 693-702; Grubbs, et al., J. Am. Chem. Soc., 2009, 131, 203802039; Zak, et al., Eur. J. Inorg. Chem., 2014, 1131-1136; Gawin, et al., ACS Catal. 2017, 7, 5443-5449. As noted above, further examples of such catalysts can also be found in U.S. Pat. No. 9,328,132. Accordingly, a few of the exemplary latent catalysts, which are organo-ruthenium compounds, without any limitation maybe selected from the group consisting of:

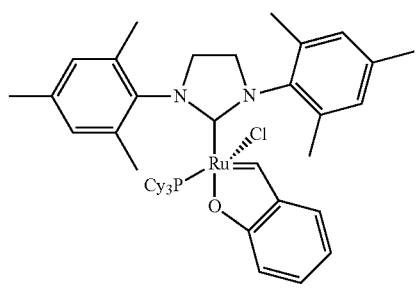

1,3-bis(2,4,6-trimethylphenylimidazolidin-2-ylidene)(tricyclohexylphosphine)-(2-oxobenzylidene)ruthenium (VI) chloride;

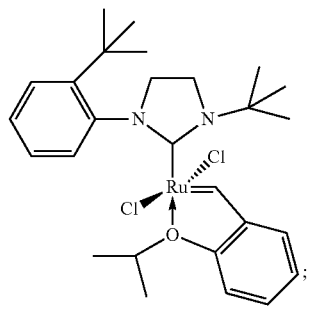

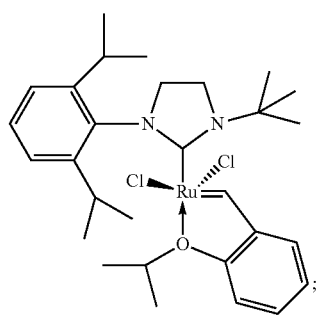

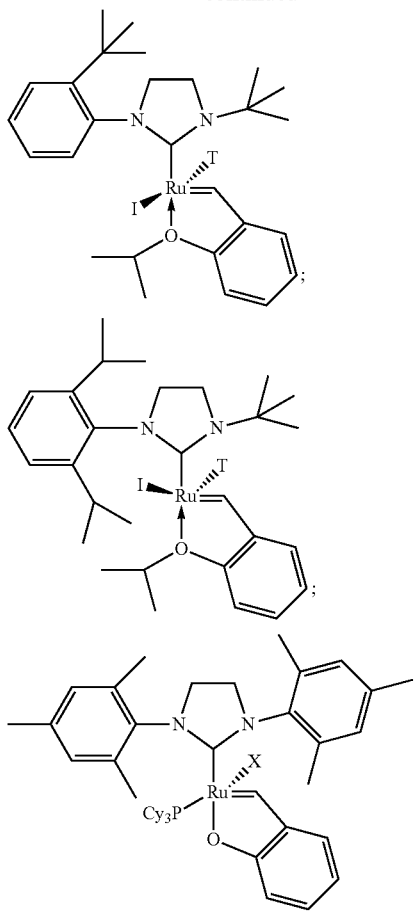
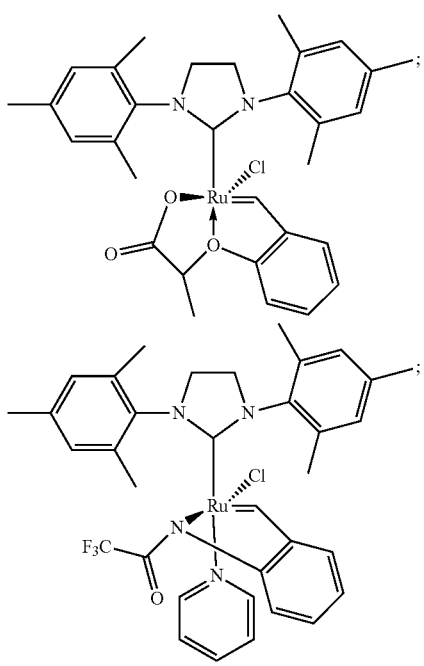
where X=halogen, —OR$_a$, —O(CO)R$_a$—OSO$_2$R$_a$, where R$_a$ is (C$_1$-C$_{12}$)alkyl, (C$_3$-C$_{12}$)cycloalkyl, (C$_6$-C$_{14}$)aryl;
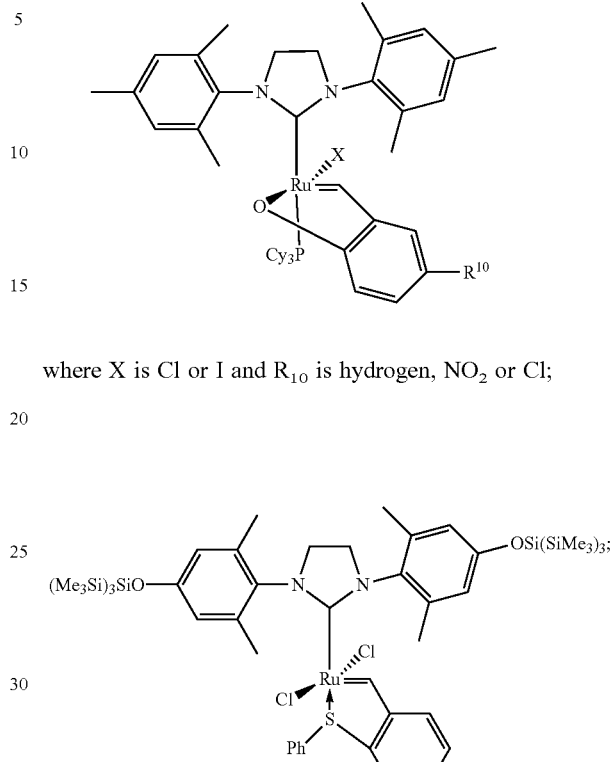
where X is Cl or I and R$_{10}$ is hydrogen, NO$_2$ or Cl;
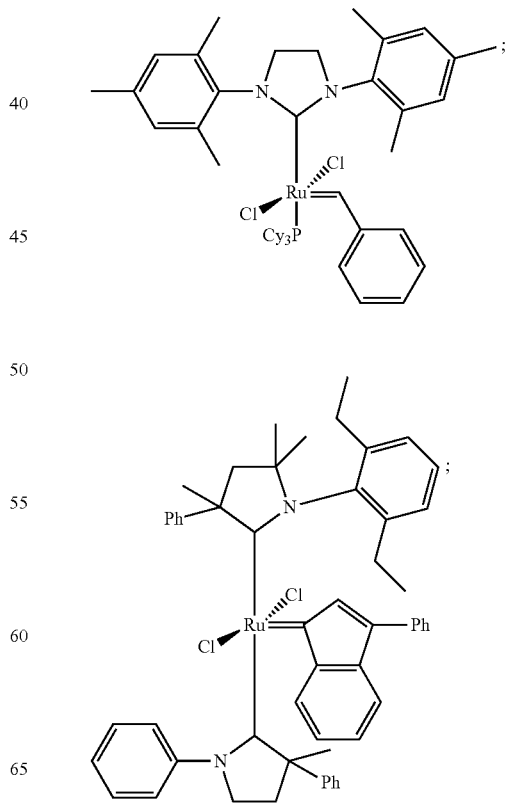

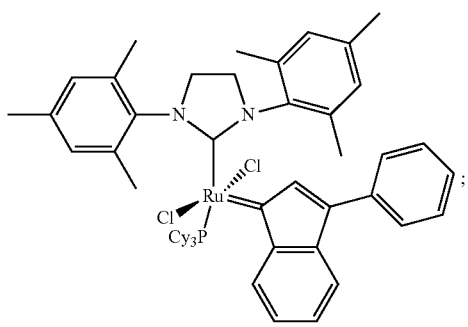

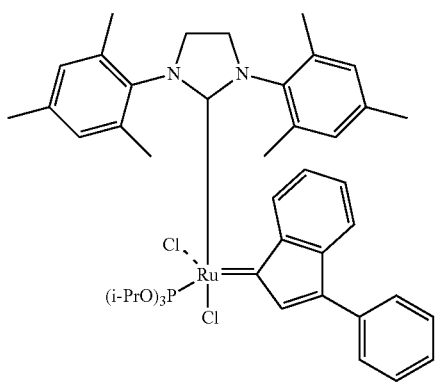

cis-[1,3-Bis(2,4,6-trimethylphenyl)-2-imidazolidinylidene]
dichloro(3-phenyl-1H-inden-1-ylidene)(triisopropylphosphite)ruthenium (II); and

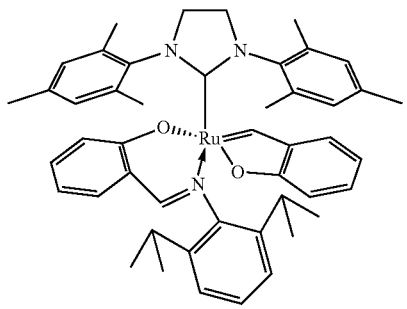

1,3-bis(2,4,6-trimethylphenylimidazolidin-2-ylidene)-(2-oxobenzylidene)-2-(((2,6-diisopropylphenyl-imino)methyl)phenoxy)ruthenium.

As noted, the composition of this invention further contains a compound capable of releasing a Bronsted acid when subjected to suitable photolytic conditions. The anion, for example chloride, of so released Bronsted acid activates the latent catalyst. Surprisingly it has now been found that certain of the known photoactive compounds, such as for example, a class of substituted xanthone derivatives can be used for this purpose.

Accordingly, in some embodiments such xanthone derivatives are of the formula (V):

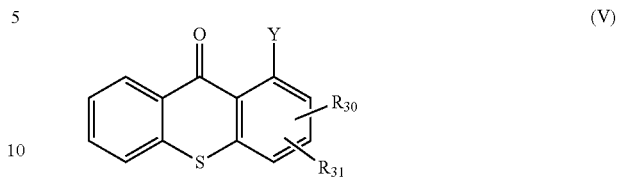

Wherein Y is halogen; and $R_{30}$ and $R_{31}$ are the same or different and independently of each other selected from hydrogen, methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_3-C_{12})$alkoxy, $(C_3-C_{12})$cycloalkoxy, $(C_6-C_{12})$bicycloalkoxy $(C_7-C_{14})$tricycloalkoxy, $(C_6-C_{10})$aryloxy$(C_1-C_3)$alkyl and $(C_6-C_{10})$-aryloxy. In some embodiments Y is fluorine, chlorine, bromine and iodine. In some embodiments Y is chlorine. In some other embodiments $R_{30}$ is hydrogen and $R_{31}$ is selected from the group consisting of methoxy, ethoxy, n-propoxy, iso-propoxy, butoxy, and the like.

Further, it has also been found that a variety of substituted triazines of the formula (VI) are also suitable as a compound capable of releasing a Bronsted acid when subjected to suitable photolytic conditions.

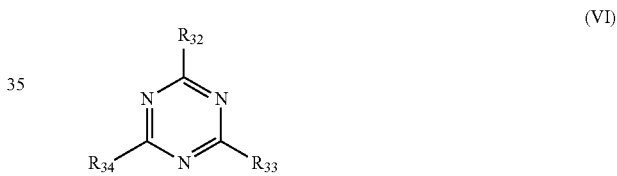

wherein $R_{32}$, $R_{33}$ and $R_{34}$ are the same or different and independently of each other selected from the group consisting of halogen, methyl, ethyl, linear or branched $(C_3-C_{12})$alkyl, trihalomethyl, pentahaloethyl, linear or branched perhalo $(C_3-C_{12})$alkyl, $(C_6-C_{10})$ aryl, $(C_6-C_{10})$ aryl$(C_1-C_3)$alkyl, perhalo$(C_6-C_{10})$ aryl, perhalo$(C_6-C_{10})$arylperhalo$(C_1-C_3)$alkyl, substituted or unsubstituted five membered or six membered heteroaryl$(C_2-C_4)$alkenyl and substituted or unsubstituted $(C_6-C_{10})$aryl$(C_2-C_4)$alkenyl provided that one of $R_{32}$, $R_{33}$ and $R_{34}$ is trihalomethyl, pentahaloethyl, linear or branched perhalo$(C_3-C_{12})$alkyl.

Representative examples of the compounds of formula (V) may be listed as follows:

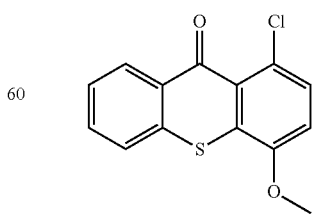

1-chloro-4-methoxy-9H-thioxanthen-9-one;

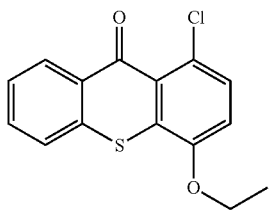 [SMILES: CCOc1ccc(Cl)c2c(=O)c3ccccc3sc12]

1-chloro-4-ethoxy-9H-thioxanthen-9-one;

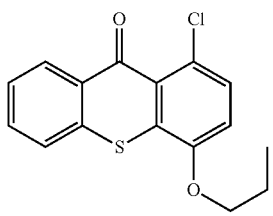 [SMILES: CCCOc1ccc(Cl)c2c(=O)c3ccccc3sc12]

1-chloro-4-propoxy-9H-thioxanthen-9-one (commercially sold under the name CPTX from Lambson);

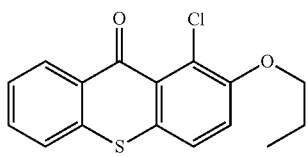 [SMILES: CCCOc1ccc2sc3ccccc3c(=O)c2c1Cl]

1-chloro-2-propoxy-9H-thioxanthen-9-one;

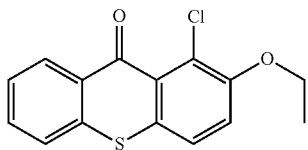 [SMILES: CCOc1ccc2sc3ccccc3c(=O)c2c1Cl]

1-chloro-2-ethoxy-9H-thioxanthen-9-one;

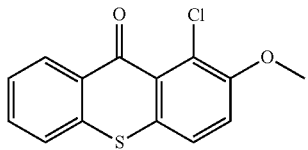 [SMILES: COc1ccc2sc3ccccc3c(=O)c2c1Cl]

1-chloro-2-methoxy-9H-thioxanthen-9-one;

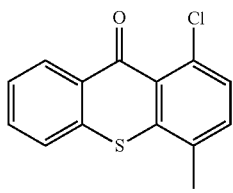 [SMILES: Cc1ccc(Cl)c2c(=O)c3ccccc3sc12]

1-chloro-4-methyl-9H-thioxanthen-9-one;

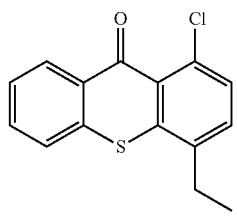

1-chloro-4-ethyl-9H-thioxanthen-9-one;

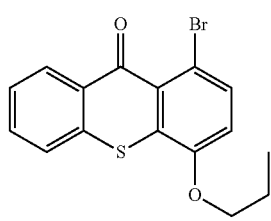 [SMILES: CCCOc1ccc(Br)c2c(=O)c3ccccc3sc12]

1-bromo-4-propoxy-9H-thioxanthen-9-one; and

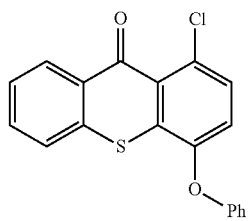 [SMILES: O=c1c2ccccc2sc2c(Oc3ccccc3)ccc(Cl)c12]

1-chloro-4-phenoxy-9H-thioxanthen-9-one.

Representative examples of the compounds of formula (VI) without any limitation may be enumerated as follows:

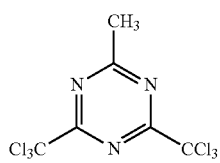

2-methyl-4,6-bis(trichloromethyl)-1,3,5-triazine;

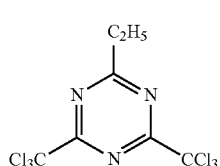

2-ethyl-4,6-bis(trichloromethyl)-1,3,5-triazine;

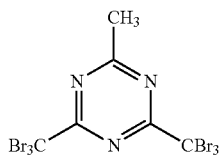

2-methyl-4,6-bis(tribromomethyl)-1,3,5-triazine;

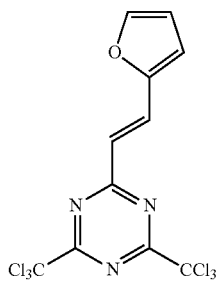

2-(2-(furan-2-yl)vinyl)-4,6-bis(trichloromethyl)-1,3,5-triazine;

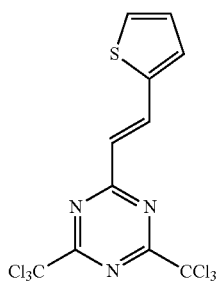

2-(2-(thiophen-2-yl)vinyl)-4,6-bis(trichloromethyl)-1,3,5-triazine;

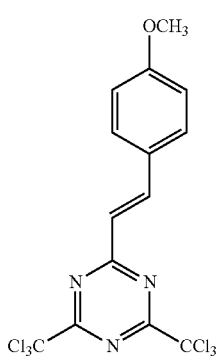

2-(4-methoxystyryl)-4,6-bis(trichloromethyl)-1,3,5-triazine; and

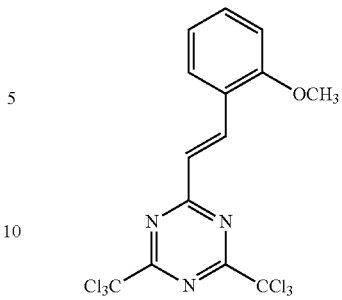

2-(2-methoxystyryl)-4,6-bis(trichloromethyl)-1,3,5-triazine.

Advantageously, it has now been found that any of the compounds of formula (V) or compounds of formula (VI) which generates a Bronsted acid when subjected to photolytic conditions can be used in the compositions of this invention. The generated Bronsted acid will activate the latent catalysts of formulae (IIA), (IIB), (IIIA), (IIIB) or (IIIC) thereby initiating the ROMP of monomers of formula (I), one or more compounds of formulae (VIIa), (VIIb) or (VIIc), and monomers of formula (IV), if present, thus causing the compositions of this invention to form 3D objects. Generally, any of the Bronsted acids can cause such activation of catalyst. Non-limiting examples of such Bronsted acids include without any limitation hydrofluoric acid, hydrochloric acid, hydrobromic acid, hydroiodic acid, trifluoroacetic acid, trifluoromethanesulfonic acid, and the like. In some embodiments the Bronsted acid generated is hydrochloric acid.

In some embodiments the compounds of formula (V) can be activated at certain wavelength of the electromagnetic radiation which can generally range from about 240 nm to 400 nm. Accordingly, any of the compounds which are active in this electromagnetic radiation can be employed in the compositions of this invention which are stable to the 3D fabrication methods. In some embodiments the wavelength of the radiation to activate the compounds of formula (V) is 260 nm. In some other embodiments the wavelength of the radiation to activate the compounds of formula (V) is 310 nm. In yet some other embodiments the wavelength of the radiation to activate the compounds of formula (V) is 395 nm.

However, any of the other known photoactive compounds which generate the Bronsted acid in order to activate the latent catalysts employed herein can also be used in the composition of this invention. All such compounds are part of this invention.

In some embodiments of this invention the composition of this invention may additionally contain other photosensitizer compounds which can activate the organo-transition compound in order to facilitate the mass polymerization of the monomers of formula (I), one or more compounds of formulae (VIIa), (VIIb) or (VIIc) and monomers of formula (IV), if present. For this purpose, any suitable sensitizer compound can be employed in the compositions of the present invention. Such suitable sensitizer compounds include, photosensitizers, such as, anthracenes, phenanthrenes, chrysenes, benzpyrenes, fluoranthenes, rubrenes, pyrenes, xanthones, indanthrenes, and mixtures thereof. In some exemplary embodiments, suitable sensitizer components include mixtures thereof. Generally, the photosensitizers absorb energy from the radiated light source and transfers that energy to the desirable substrate/reactant, which in the present invention is the compound of formula (V) employed in the composition of this invention.

Any amount of latent catalyst and the compound of formula (V) can be employed in the composition of this invention which will bring about the intended result. Generally, the molar ratio of monomer:latent catalyst:compound of formula (V) or a compound of formula (VI) is in the range of 10,000:1:1 to 5,000:1:1 or lower. In some other embodiments, the compound of formula (V) is employed at higher level than the latent catalyst, for example, such ranges may include monomer:latent catalyst:compound of formula (V) or a compound of formula (VI) is 10,000:1:2, 10,000:1:4 or higher. In some other embodiments such monomer:latent catalyst: compound of formula (V) or a compound of formula (VI) is 15,000:1:4, 20,000:1:4 or higher.

Advantageously, it has further been found that the composition according to this invention forms a substantially three dimensional object when mass polymerized, generally, when exposed to suitable radiation at a wavelength in the range from 260 nm to 400 nm. That is to say, when the composition of this invention is exposed to suitable radiation, the monomers undergo mass polymerization to form solid objects under routine 3D printing technologies.

In some embodiments the composition of this invention undergoes mass polymerization when exposed to suitable UV irradiation which is substantially free of any monomer or volatile oligomeric product.

It has also been found that various other viscosity modifiers that are compatible with the compositions of this invention can also be employed in order to modulate the viscosity of the composition before subjecting it to the mass polymerization conditions. Suitable examples of such viscosity modifiers include transparent polymers such as for example polystyrene, polyesters (polyethylene terphthalate, PET), and the like.

Accordingly, in some embodiments of this invention there is provided a composition comprising one or more monomers of formula (I), one or more compounds of formulae (VIIa), (VIIb) or (VIIc), optionally one or more monomers of formula (IV), a latent catalyst, a compound of formula (V) as described hereinabove. Any of the monomers of formula (I) as described hereinabove can be used in this aspect of the invention along with one or more compounds of formulae (VIIa), (VIIb) or (VIIc), optionally in combination with one or more monomers of formula (IV). The monomers of formula (I) featuring a viscosity below 50 centipoise are generally employed. When more than two monomers of formula (I) are employed the first monomer is completely miscible with the second monomer and forms a clear solution. Further, combining such solution with one or more compounds of formulae (VIIa), (VIIb) or (VIIc) provides a clear solution. When the composition is exposed to suitable irradiation and fabricated under suitable 3D printing conditions forms a 3D object.

In another embodiment of this invention, the composition of this invention encompasses a mixture of 2-phenethyl-1,2,3,4,4a,5,8,8a-octahydro-1,4:5,8-dimethanonaphthalene (PETD), 1,3-bis(2-(bicyclo[2.2.1]hept-5-en-2-yl)ethyl)-1,1,3,3-tetramethyldisiloxane (BisENBTMDS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

In another embodiment of this invention, the composition of this invention encompasses a mixture of 2-phenethyl-1,2,3,4,4a,5,8,8a-octahydro-1,4:5,8-dimethanonaphthalene (PETD), 1,5-bis(2-(bicyclo[2.2.1]hept-5-en-2-yl)ethyl)-1,1,3,3,5,5-hexamethyltrisiloxane (BisENBHMTS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

In another embodiment of this invention, the composition of this invention encompasses a mixture of 2-phenethyl-1,2,3,4,4a,5,8,8a-octahydro-1,4:5,8-dimethanonaphthalene (PETD), 5-decylbicyclo[2.2.1]hept-2-ene (DecylNB), 1,3-bis(2-(bicyclo[2.2.1]hept-5-en-2-yl)ethyl)-1,1,3,3-tetramethyldisiloxane (BisENBTMDS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

In another embodiment of this invention, the composition of this invention encompasses a mixture of 2-phenethyl-1,2,3,4,4a,5,8,8a-octahydro-1,4:5,8-dimethanonaphthalene (PETD), trisnorbornenylisobutyl POSS, 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

In another embodiment of this invention, the composition of this invention encompasses a mixture of 2-phenethyl-1,2,3,4,4a,5,8,8a-octahydro-1,4:5,8-dimethanonaphthalene (PETD), 3,3'-oxybis(1,5-bis(2-(bicyclo[2.2.1]hept-5-en-2-yl)ethyl)-3-cyclohexyl-1,1,5,5-tetramethyltrisiloxane (TeTENBOMSS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

In another embodiment of this invention, the composition of this invention encompasses a mixture of 2-phenethyl-1,2,3,4,4a,5,8,8a-octahydro-1,4:5,8-dimethanonaphthalene (PETD), 3a,4,4a,5,8,8a,9,9a-octahydro-1H-4,9:5,8-dimethanocyclopenta[b]naphthalene (CPD3); 3,3'-oxybis(1,5-bis(2-(bicyclo[2.2.1]hept-5-en-2-yl)ethyl)-3-cyclohexyl-1,1,5,5-tetramethyltrisiloxane (TeTENBOMSS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

In another embodiment of this invention, the composition of this invention encompasses a mixture of 2-phenethyl-1,2,3,4,4a,5,8,8a-octahydro-1,4:5,8-dimethanonaphthalene (PETD), 3a,4,4a,5,8,8a,9,9a-octahydro-1H-4,9:5,8-dimethanocyclopenta[b]naphthalene (CPD3); 5-decylbicyclo[2.2.1]hept-2-ene (DecylNB), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

In another embodiment of this invention, the composition of this invention encompasses a mixture of 2-hexyl-1,2,3,4,4a,5,8,8a-octahydro-1,4:5,8-dimethanonaphthalene (HexylTD), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

In another embodiment of this invention, the composition of this invention encompasses a mixture of 2-hexyl-1,2,3,4,4a,5,8,8a-octahydro-1,4:5,8-dimethanonaphthalene (HexylTD), 3a,4,4a,5,8,8a,9,9a-octahydro-1H-4,9:5,8-dimethanocyclopenta[b]naphthalene (CPD3); 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

In another embodiment of this invention, the composition of this invention encompasses a mixture of 2-decyl-1,2,3,4,4a,5,8,8a-octahydro-1,4:5,8-dimethanonaphthalene (DecylTD), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

In a further aspect of this invention there is also provided a kit for forming a three dimensional object. There is dispensed in this kit a composition of this invention. Accordingly, in some embodiments there is provided a kit in which there is dispensed one or more monomers of formula (I), optionally one or more compounds of formulae (VIIa), (VIIb) or (VIIc), optionally one or more monomers of formula (IV) and a compound of formula (V), so as to obtain a desirable result and/or for intended purpose. Further, said kit comprises a latent catalyst as described herein. The monomers of formulae (I), monomers of formula (IV), and compounds of formulae (VIIa), (VIIb) or (VIIc) are the ones as described hereinabove. Any of the monomers of formula (I) in combination with any of the monomers of formula (IV), if needed, and any of the compounds of formulae (VIIa), (VIIb) or (VIIc), if needed, can be dispensed in the kit with desirable respective quantities so as to obtain the intended result.

In some embodiments, the aforementioned kit encompasses two or more monomers of formula (I) distinct from one another as described hereinabove. In some other embodiments the kit of this invention encompasses at least two monomers wherein first monomer facilitates dissolution of the second monomer and/or the latent catalyst and the additives as described hereinabove. Any of the monomers of formula (I) as described herein can be used in this embodiment. The molar ratio of first and the second monomer of formula (I) contained in these components can vary and may range from 1:99 to 99:1, or 10:90 to 90:10, 20:80 to 80:20, 30:70 to 70:30, 60:40 to 40:60 or 50:50, and so on. In some other embodiments the kit may encompass a composition wherein dispensed more than two monomers of formula (I), each distinct from one another. Further, as noted the first monomer of formula (I) is completely soluble in the second monomer of formula (I) to form a clear solution at room temperature. In some embodiments the monomer mixture may become a clear solution at slightly elevated temperature, such as for example, 30° C. or 40° C. or 50° C. or 70° C. or higher, before they undergo mass polymerization. In another aspect of this embodiment of this invention the composition of this invention undergoes mass polymerization when exposed to a suitable radiation for a sufficient length of time to form a 3D object. That is to say that the composition of this invention when used in a suitable 3D printing system capable of exposing to a suitable radiation forms a desirable 3D object. Generally, as already noted above, such polymerization can take place when exposed to suitable radiation at a wavelength from about 260 nm to 400 nm or higher. The exposure can be at stages from 260 nm to 400 nm or at suitable wavelengths as described herein. By practice of this invention it is now possible to form 3D objects using any of the known 3D printing technologies.

In some embodiments the kit according to this invention contains at least two monomers of formula (I) distinct from one another, wherein one monomer is completely soluble in the other monomer, and when said composition is exposed to radiation at 395 nm for a sufficient length of time it forms a three dimensional object.

In some embodiments, the kit as described herein encompasses a composition, which contains a mixture of 2-phenethyl-1,2,3,4,4a,5,8,8a-octahydro-1,4:5,8-dimethanonaphthalene (PETD), 1,3-bis(2-(bicyclo[2.2.1]hept-5-en-2-yl)ethyl)-1,1,3,3-tetramethyldisiloxane (BisENBTMDS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

In some embodiments, the kit as described herein encompasses a composition, which contains a mixture of 2-phenethyl-1,2,3,4,4a,5,8,8a-octahydro-1,4:5,8-dimethanonaphthalene (PETD), 1,5-bis(2-(bicyclo[2.2.1]hept-5-en-2-yl)ethyl)-1,1,3,3,5,5-hexamethyltrisiloxane (BisENBHMTS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

In some embodiments, the kit as described herein encompasses a composition, which contains a mixture of 2-phenethyl-1,2,3,4,4a,5,8,8a-octahydro-1,4:5,8-dimethanonaphthalene (PETD), 5-decylbicyclo[2.2.1]hept-2-ene (DecylNB), 1,3-bis(2-(bicyclo[2.2.1]hept-5-en-2-yl)ethyl)-1,1,3,3-tetramethyldisiloxane (BisENBTMDS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

As noted, the compositions of this invention can be used in any of the known three dimensional (3D) printing technologies and other printing technologies. A few of the 3D printing procedures known in the art include continuous liquid interface production (CLIP), layer by layer approach (LBL), inkjet printing and frontal polymerization method, such as frontal ring open metathesis (FROMP) technique, see for example Robertson et al., Nature, Vol. 557, 223-227 (2018).

In a CLIP approach, a 3D object is continuously formed by projecting a continuous sequence of UV images (generated by a digital light-processing (DLP) imaging unit or a laser to generate the part) through an oxygen permeable, UV-transparent window below a liquid resin bath containing the compositions of this invention. The dead zone created above the window maintains a liquid interface below the advancing part. Above the dead zone, the curing part is continuously drawn out of the resin bath. The suction forces resulted due to this drawing replenishes the resin bath at the same time. In this way various parts of different dimensions up to several centimeters with part resolution lower than 100 microns can be fabricated.

In a 3D inkjet printing technology, the compositions of this invention can be used as photopolymerizable ink compositions to form lines and vias on a substrate, typically on a silicon wafer. A wide variety of parts having utility in electronic and optoelectronic applications can thus be manufactured using the compositions of this invention. Non limiting examples of such applications include manufacturing of OLED devices on a variety of substrates, which can be produced substantially in a particle free environment at high yields. The compositions of this invention may act as organic encapsulant layers and/or as filler materials in some of such OLED devices.

Accordingly, in yet another aspect of this invention there is further provided a method of forming a three dimensional object comprising:

providing a homogeneous clear composition in a suitable container, the composition comprising one or more monomers of formula (I), one or more compounds of formulae (VIIa), (VIIb) or (VIIc), a latent catalyst and a compound of formula (V) or a compound of formula (VI), optionally in combination with one or more monomers of formula (IV);

exposing to suitable UV radiation while drawing the composition from the container; and forming a three dimensional object.

The 3D objects formed in accordance with the method of this invention exhibit excellent thermal and mechanical properties. In general, the properties of these objects can be tailored to intended end use. For example, the thermal properties of the 3D objects can be tailored to be stable up to 180° C. or higher depending upon the types of monomers of formula (I) in combination with monomers of formula (IV) employed to form such 3D objects. Similarly, the mechanical properties can also be tailored to desired mechanical properties simply by the selection of suitable monomers as described herein. In general, by tailoring the proper choice of monomers the parts possessing very high impact strength can be fabricated.

Accordingly, in some of the embodiments of this invention there is also provided a three dimensional object comprising the composition of this invention which exhibits excellent thermal and mechanical properties.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

EXAMPLES

The following abbreviations have been used hereinbefore and hereafter in describing some of the compounds, instruments and/or methods employed to illustrate certain of the embodiments of this invention: PETD—2-phenethyl-1,2,3,4,4a,5,8,8a-octahydro-1,4:5,8-dimethanonaphthalene; DecylNB—5-decylbicyclo[2.2.1]hept-2-ene; BisENBTMDS—1,3-bis(2-(bicyclo[2.2.1]hept-5-en-2-yl)ethyl)-1,1,3,3-tetramethyldisiloxane; BisENBHMTS—1,5-bis(2-(bicyclo[2.2.1]hept-5-en-2-yl)ethyl)-1,1,3,3,5,5-hexamethyltrisiloxane; TeTENBOMSS—3,3'-oxybis(1,5-bis(2-(bicyclo[2.2.1]hept-5-en-2-yl)ethyl)-3-cyclohexyl-1,1,5,5-tetramethyltrisiloxane; CPD3—3a,4,4a,5,8,8a,9,9a-octahydro-1H-4,9:5,8-dimethanocyclopenta[b]naphthalene; HexylTD—2-hexyl-1,2,3,4,4a,5,8,8a-octahydro-1,4:5,8-dimethanonaphthalene; DecylTD—2-decyl-1,2,3,4,4a,5,8,8a-octahydro-1,4:5,8-dimethanonaphthalene; Ru-II—1,3-bis(2,4,6-trimethylphenylimidazolidin-2-ylidene)-(2-oxobenzylidene)-2-(((2,6-diisopropylphenyl-imino)methyl)phenoxy)ruthenium; CPTX—1-chloro-4-propoxy-9H-thioxanthen-9-one; DSC—differential scanning calorimetry; TGA—thermogravimetric analysis.

Various monomers as used herein are either commercially available or can be readily prepared following the procedures as described in U.S. Pat. No. 9,944,818.

The following Examples demonstrate that the compositions of this invention are quite stable at ambient temperature conditions and even up to 35° C. for several days and can very readily be mass polymerized by exposing to a suitable radiation as specified below.

Example 1

Mass Polymerization of PETD/BisENBTMDS

In a glass bottle, Ru-II (1 molar part) and CPTX (8 molar parts) were dissolved in PETD (9,500 molar parts) and BisENBTMDS (500 molar parts) without solvent to form a clear solution. The solution was heated to 70° C. and UV light exposed for 4 seconds (LED 270 mW/cm$^2$, 395 nm). The solution turned to a solid indicating the monomer was fully polymerized, as confirmed by both DSC and TGA. The residue percentage from isothermal TGA (1 h at 100° C.) after UV exposure was >99%. The unexposed solution was free flowing even after 21 days at room temperature. This indicates that during the UV exposure CPTX releases a chloride ion that activates Ru-II catalyst. A sample was prepared for impact strength measurement in accordance with ASTM D256 and the impact strength was 160 J/m.

Examples 2-22

Mass Polymerization of Various Monomers

The procedures of Example 1 were substantially repeated in these Examples 2 to 22 except that various monomers and at different molar ratios as listed in Table 1 were employed. The monomers used and their molar ratios along with the measured impact strength of the resulting polymers are summarized in Table 1.

TABLE 1

| Example No. | Monomers (molar parts) | Impact Strength (J/m) |
| --- | --- | --- |
| 2 | PETD/BisENBTMDS 90/10 molar ratio | 106 |
| 3 | PETD/BisENBHMTS 95/5 molar ratio | 186 |
| 4 | PETD/BisENBHMTS 90/10 molar ratio | 104 |
| 5 | PETD/DecylNB/BisENBTMDS 85.5/9.5/5 mole ratio | 139 |
| 6 | PETD/DecylNB/BisENBTMDS 90/9/1 mole ratio | 47 |
| 7 | PETD/trisnorbornenylisobutyl POSS 98.5/1.5 mole ratio | 91 |
| 8 | PETD/trisnorbornenylisobutyl POSS 97/3 mole ratio | 144 |
| 9 | PETD/TeTENBOMSS 98/2 mole ratio | 170 |
| 10 | PETD/CPD3/TeTENBOMSS 95/1/4 mole ratio | 120 |
| 11 | PETD/CPD3/BisENBTMDS 94/1/5 mole ratio | 177 |
| 12 | PETD/CPD3/BisENBTMDS 90/5/5 mole ratio | 155 |
| 13 | DecylNB/CPD3/PETD 50/25/25 mole ratio | 240 |
| 14 | DecylNB/CPD3/PETD 50/10/40 mole ratio | 565 |
| 15 | HexylTD | 786 |
| 16 | HexylTD/CPD3 99/1 mole ratio | 771 |
| 17 | HexylTD/CPD3 95/5 mole ratio | 736 |
| 18 | HexylTD/CPD3 90/10 mole ratio | 603 |
| 19 | HexylTD/CPD3 85/15 mole ratio | 622 |
| 20 | HexylTD/CPD3 80/20 mole ratio | 473 |

TABLE 1-continued

| Example No. | Monomers (molar parts) | Impact Strength (J/m) |
|---|---|---|
| 21 | DecylTD | 578 |
| 22 | HexylTD/CPD3/BisENBTMDS 85/10/5 mole ratio | 180 |

Comparative Example 1

The procedures of Example 6 were substantially repeated in this Comparative Example 1 except that no BisENBTMDS was employed, PETD/DecylNB (90/10 molar ratio). The measured impact strength of the resulting polymer was 29 J/m.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A composition comprising:
a) one or more monomers of formula (I):

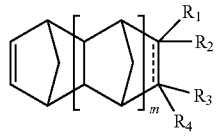

(I)

wherein:
m is an integer 0, 1 or 2;
----- is a single bond or a double bond;
$R_1$, $R_2$, $R_3$ and $R_4$ are the same or different and each independently selected from the group consisting of hydrogen, halogen, methyl, ethyl, linear or branched $(C_3-C_{16})$alkyl, $(C_2-C_{16})$alkenyl, perfluoro$(C_1-C_{12})$alkyl, $(C_3-C_{12})$cycloalkyl, $(C_6-C_{12})$bicycloalkyl, $(C_7-C_{14})$tricycloalkyl, methoxy, ethoxy, linear or branched $(C_3-C_{16})$alkoxy, $(C_2-C_6)$acyl, $(C_2-C_6)$acyloxy, $(C_6-C_{14})$aryl, $(C_6-C_{14})$aryl$(C_1-C_6)$alkyl, perfluoro$(C_6-C_{14})$aryl, perfluoro$(C_6-C_{14})$aryl$(C_1-C_3)$alkyl, $(C_6-C_{14})$aryloxy, $(C_6-C_{14})$aryl$(C_1-C_6)$alkoxy, tri$(C_1-C_6)$alkoxysilyl and a group of formula (A):

—Z-Aryl (A)

wherein:
Z is a bond or a group selected from the group consisting of:
$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—(CO)O—$(CR_5R_6)_b$, $(CR_5R_6)_a$—O(CO)—$(CR_5R_6)_b$, $(CR_5R_6)_a$—(CO)—$(CR_5R_6)_b$, where a and b are integers which may be the same or different and each independently is 1 to 12;
$R_5$ and $R_6$ are the same or different and each independently selected from the group consisting of hydrogen, methyl, ethyl, linear or branched $(C_3-C_6)$alkyl, methoxy, ethoxy, linear or branched $(C_3-C_6)$alkyloxy, $(C_2-C_6)$acyl, $(C_2-C_6)$acyloxy, phenyl and phenoxy;
Aryl is phenyl or phenyl substituted with one or more of groups selected from the group consisting of methyl, ethyl, linear or branched $(C_3-C_6)$alkyl, hydroxy, ethyl, linear or branched $(C_3-C_6)$alkyl, hydroxy, methoxy, ethoxy, linear or branched $(C_3-C_6)$alkyloxy, $(C_2-C_6)$acyl, $(C_2-C_6)$acyloxy, phenyl and phenoxy; or
one of $R_1$ or $R_2$ taken together with one of $R_3$ or $R_4$ and the carbon atoms to which they are attached to form a $(C_5-C_7)$carbocyclic ring optionally containing one or more double bonds;

b) one or more compounds selected from the group consisting of:

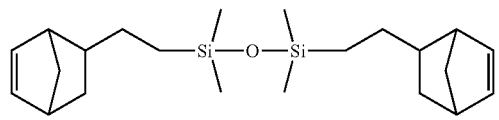 [SMILES: C[Si](C)(CCC1CC2C=CC1C2)O[Si](C)(C)CCC1CC2C=CC1C2]

1,3-bis(2-(bicyclo[2.2.1]hept-5-en-2-yl)ethyl)-1,1,3,3-tetramethyldisiloxane (BisENBTMDS);

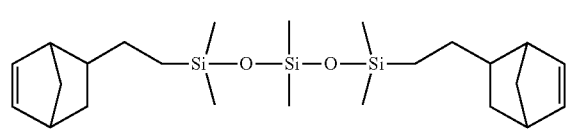

1,5-bis(2-(bicyclo[2.2.1]hept-5-en-2-yl)ethyl)-1,1,3,3,5,5-hexamethyltrisiloxane (BisENBHMTS);

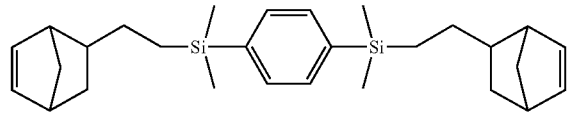 [SMILES: C[Si](C)(CCC1CC2C=CC1C2)c1ccc([Si](C)(C)CCC2CC3C=CC2C3)cc1]

1,4-bis((2-(bicyclo[2.2.1]hept-5-en-2-yl)ethyl)dimethylsilyl)benzene;

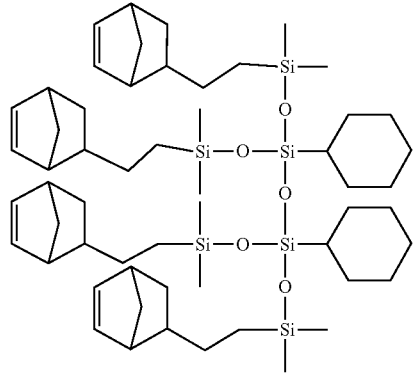 [SMILES: C[Si](C)(CCC1CC2C=CC1C2)O[Si](O[Si](C)(C)CCC1CC2C=CC1C2)(O[Si](O[Si](C)(C)CCC1CC2C=CC1C2)(O[Si](C)(C)CCC1CC2C=CC1C2)C1CCCCC1)C1CCCCC1]

3,3'-oxybis(1,5-bis(2-(bicyclo[2.2.1]hept-5-en-2-yl)ethyl)-3-cyclohexyl-1,1,5,5-tetramethyltrisiloxane) (TeTENBOMSS); and

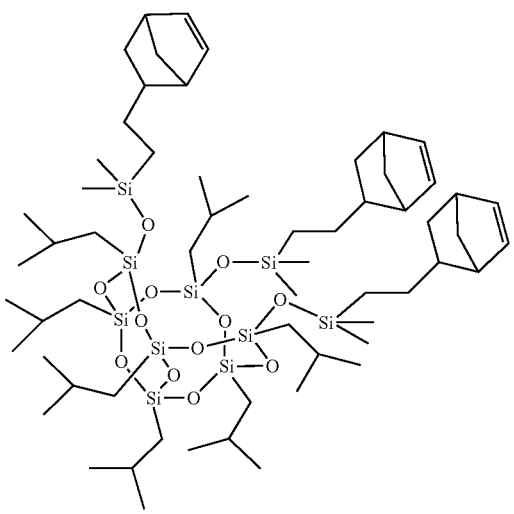 [SMILES: CC(C)C[Si]1(O[Si](C)(C)CCC2CC3C=CC2C3)O[Si]2(CC(C)C)O[Si](CC(C)C)(O[Si](C)(C)CCC3CC4C=CC3C4)O[Si]3(CC(C)C)O[Si](CC(C)C)(O[Si](C)(C)CCC4CC5C=CC4C5)O[Si](CC(C)C)(O1)O[Si](CC(C)C)(O2)O3]

3,7,14-tris(((2-(bicyclo[2.2.1]hept-5-en-2-yl)ethyl)dimethylsilyl)oxy)-1,3,5,7,9,11,14-heptaisobutyl-2,4,6,8,10,12,13,15,16-nonaoxa-1,3,5,7,9,11,14-heptasilatricyclo[7.3.3.15,11]hexadecane (trisnorbornenylisobutyl POSS);

c) an organo-ruthenium compound selected from the group consisting of:

a compound of formula (IIB):

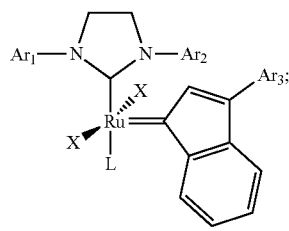

(IIB)

a compound of formula (IIIA):

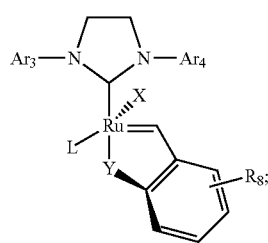

(IIIA)

a compound of formula (IIIB):

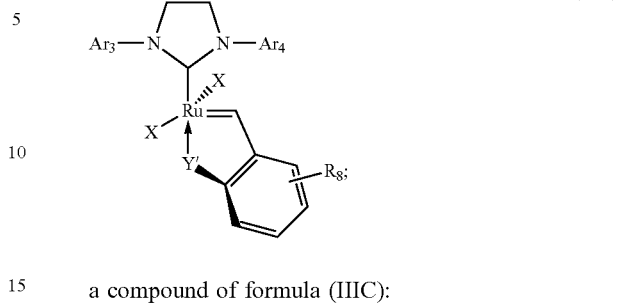

(IIIB)

a compound of formula (IIIC):

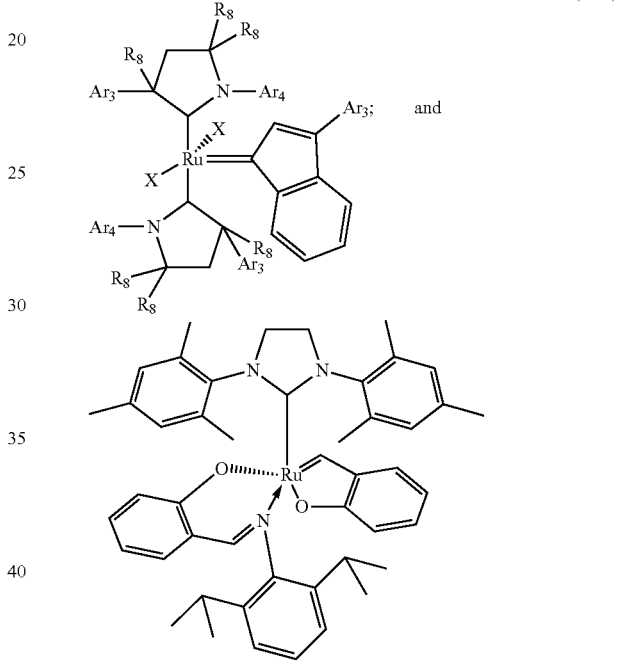

(IIIC)

1,3-bis(2,4,6-trimethylphenylimidazolidin-2-ylidene)-(2-oxobenzylidene)-2-(((2,6-diisopropylphenylimino)methyl)phenoxy)ruthenium;

wherein:

X is a halogen or an anionic ligand;

Y is selected from the group consisting of O and S;

Y' is $OR_9$ $SR_9$ and $-N=CHC(O)O(C_1-C_6)alkyl$, where $R_9$ is selected from the group consisting of methyl, ethyl, linear or branched $(C_1-C_6)$alkyl, $(C_6-C_{10})$aryl, methoxy, ethoxy, linear or branched $(C_1-C_6)$alkoxy, $(C_6-C_{10})$aryloxy, $-OCH(CH_3)C(O)N(CH_3)(OCH_3)$;

L is $PR_3$ or $O=PR_3$, where R is independently selected from the group consisting of isopropyl, sec-butyl, tert-butyl, cyclohexyl, bicyclo$(C_5-C_{10})$alkyl, phenyl, benzyl, isopropoxy, sec-butoxy, tert-butoxy, cyclohexyloxy, phenoxy and benzyloxy; or X and L form a bidentate anionic ligand of the formula X-L;

$R_7$ is selected from the group consisting of isopropyl, sec-butyl, tert-butyl, substituted or unsubstituted cyclohexyl, substituted or unsubstituted phenyl, substituted or unsubstituted biphenyl and substituted or unsubstituted naphthyl;

$R_8$ is selected from the group consisting of methyl, ethyl, linear or branched $(C_1-C_6)$alkyl, $(C_6-C_{10})$aryl, methoxy, ethoxy, linear or branched $(C_1-C_6)$alkoxy, $(C_6-C_{10})$aryloxy, —NHCO$(C_1-C_6)$alkyl, —NHCO-perfluoro$(C_1-C_6)$alkyl, —SO$_2$N$((C_1-C_6)$alkyl$)_2$ and —NO$_2$;

$Ar_1$, $Ar_2$ $Ar_3$ and $Ar_4$ are the same or different and each independently selected from the group consisting of substituted or unsubstituted phenyl, substituted or unsubstituted biphenyl and substituted or unsubstituted naphthyl;

wherein said substituents are selected from the group consisting of methyl, ethyl, iso-propyl, tert-butyl and phenyl; and d) a compound capable of releasing a Bronsted acid when subjected to photolytic conditions, said compound selected from the group consisting of:
a compound of formula (V):

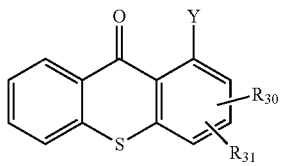

(V)

wherein

Y is halogen; and $R_{30}$ and $R_{31}$ are the same or different and independently of each other selected from the group consisting of hydrogen, methyl, ethyl, linear or branched $(C_3-C_{12})$alkyl, $(C_3-C_{12})$cycloalkyl, $(C_6-C_{12})$bicycloalkyl, $(C_7-C_1a)$tricycloalkyl, $(C_6-C_{10})$aryl, $(C_6-C_{10})$aryl$(C_1-C_3)$alkyl, $(C_1-C_{12})$alkoxy, $(C_3-C_{12})$cyclokoxy, $(C_6-C_{12})$bicycloalkoxy, $(C_7-C_{14})$tricycloalkoxy, $(C_6-C_{10})$aryloxy$(C_1-C_3)$alkyl and $(C_6-C_{10})$-aryloxy; and
a compound of formula (VI):

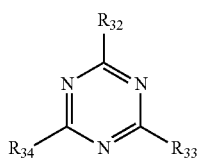

(VI)

wherein $R_{32}$, $R_{33}$ and $R_{34}$ are the same or different and independently of each other selected from the group consisting of halogen, methyl, ethyl, linear or branched $(C_3-C_{12})$alkyl, trihalomethyl, pentahaloethyl, linear or branched perhalo$(C_3-C_{12})$alkyl, $(C_6-C_{10})$aryl, $(C_6-C_{10})$aryl$(C_1-C_3)$alkyl, perhalo$(C_6-C_{10})$aryl, perhalo$(C_6-C_{10})$arylperhalo$(C_1-C_3)$alkyl, substituted or unsubstituted five membered or six membered heteroaryl$(C_2-C_4)$alkenyl and substituted or unsubstituted $(C_6-C_{10})$aryl$(C_2-C_4)$alkenyl provided that one of $R_{32}$, $R_{33}$ and $R_{34}$ is trihalomethyl, pentahaloethyl, linear or branched perhalo$(C_3-C_{12})$alkyl; and wherein said composition is in a clear liquid form at room temperature.

2. The composition according to claim 1, wherein said composition comprising first and second monomer of formula (I) distinct from each other and one of said first and second monomers having a viscosity below 50 centipoise, and wherein said first monomer is completely miscible with said second monomer to form a clear solution.

3. The composition according to claim 1, wherein said composition comprising a monomer of formula (I) wherein m is 1 and one of $R_1$, $R_2$, $R_3$ or $R_4$ is selected from the group consisting of hexyl, decyl and phenethyl, and remaining $R_1$, $R_2$, $R_3$ and $R_4$ are hydrogen.

4. The composition according to claim 1, wherein said one or more compounds of d) is selected from the group consisting of:

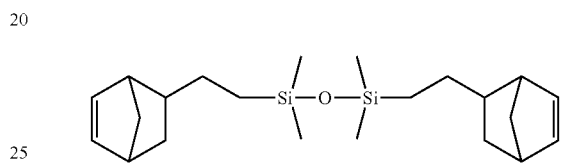

1,3-bis(2-(bicyclo[2.2.1]hept-5-en-2-yl)ethyl)-1,1,3,3-tetramethyldisiloxane (BisENBTMDS);

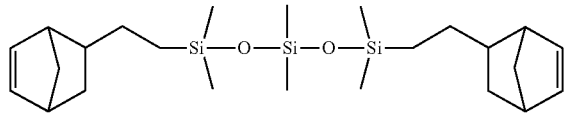 [SMILES: C[Si](C)(CCC1CC2C=CC1C2)O[Si](C)(C)O[Si](C)(C)CCC1CC2C=CC1C2]

1,5-bis(2-(bicyclo[2.2.1]hept-5-en-2-yl)ethyl)-1,1,3,3,5,5-hexamethyltrisiloxane (BisENBHMTS);

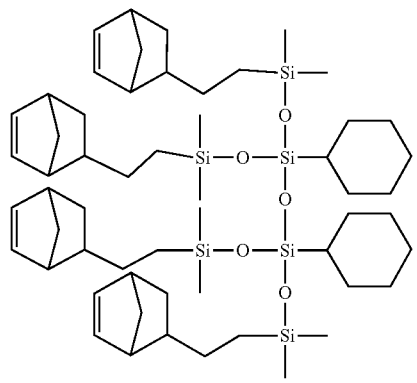 [SMILES: C[Si](C)(CCC1CC2C=CC1C2)O[Si](O[Si](C)(C)CCC1CC2C=CC1C2)(O[Si](O[Si](C)(C)CCC1CC2C=CC1C2)(O[Si](C)(C)CCC1CC2C=CC1C2)C1CCCCC1)C1CCCCC1]

3,3'-oxybis(1,5-bis(2-(bicyclo[2.2.1]hept-5-en-2-yl)ethyl)-3-cyclohexyl-1,1,5,5-tetramethyltrisiloxane) (TeTENBOMSS);

and

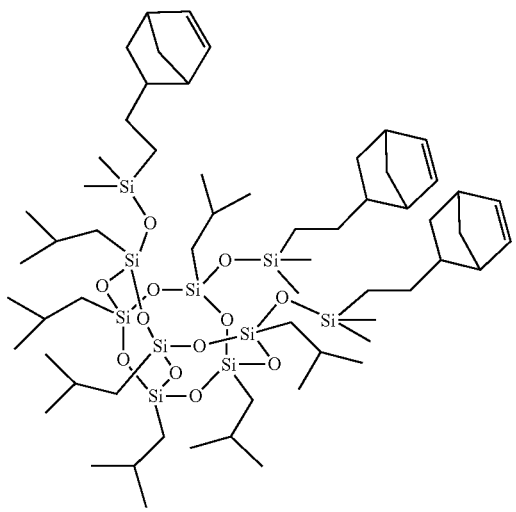 [SMILES: CC(C)C[Si]1(O[Si](C)(C)CCC2CC3C=CC2C3)O[Si]2(CC(C)C)O[Si](CC(C)C)(O[Si](C)(C)CCC3CC4C=CC3C4)O[Si]3(CC(C)C)O[Si](CC(C)C)(O[Si](C)(C)CCC4CC5C=CC4C5)O[Si](CC(C)C)(O1)O[Si](CC(C)C)(O2)O3]

3,7,14-tris(((2-(bicyclo[2.2.1]hept-5-en-2-yl)ethyl)dimethylsilyl)oxy)-1,3,5,7,9,11,14-heptaisobutyl-2,4,6,8,10,12,13,15,16-nonaoxa-1,3,5,7,9,11,14-heptasilatricyclo[7.3.3.15,11]hexadecane (trisnorbornenylisobutyl POSS).

5. The composition according to claim 1, wherein the monomer of formula (I) is selected from the group consisting of:

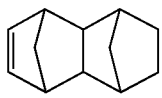

tetracyclododecene;

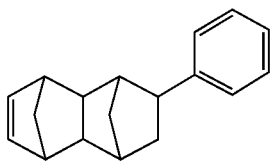 [SMILES: C1=CC2CC1C1C3CC(c4ccccc4)C(C3)C21]

2-phenyl-tetracyclododecene (PhTD);

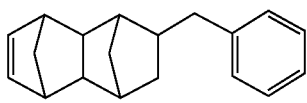 [SMILES: C1=CC2CC1C1C3CC(Cc4ccccc4)C(C3)C21]

2-benzyl-1,2,3,4,4a,5,8,8a-octahydro-1,4:5,8-dimethanonaphthalene;

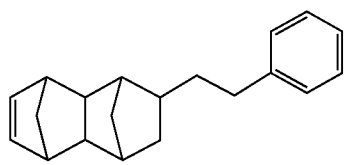 [SMILES: C1=CC2CC1C1C3CC(CCc4ccccc4)C(C3)C21]

2-phenethyl-1,2,3,4,4a,5,8,8a-octahydro-1,4:5,8-dimethanonaphthalene (PETD);

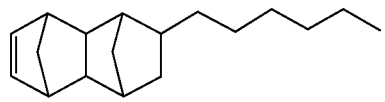 [SMILES: CCCCCCC1CC2CC1C1C3C=CC(C3)C21]

2-hexyl-1,2,3,4,4a,5,8,8a-octahydro-1,4:5,8-dimethanonaphthalene (HexylTD);

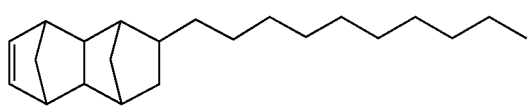 [SMILES: CCCCCCCCCCC1CC2CC1C1C3C=CC(C3)C21]

2-decyl-1,2,3,4,4a,5,8,8a-octahydro-1,4:5,8-dimethanonaphthalene (DecylTD);

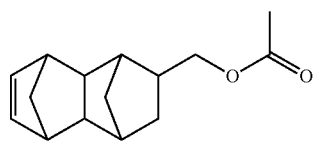 [SMILES: CC(=O)OCC1CC2CC1C1C3C=CC(C3)C21]

(1,2,3,4,4a,5,8,8a-octahydro-1,4:5,8-dimethanonaphthalen-2-yl)methyl acetate (TDMeOAc);

tetracyclododecadiene;

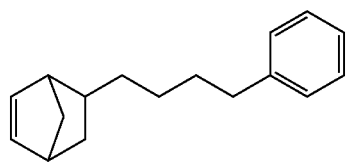 [SMILES: C1=CC2CC1CC2CCCCc1ccccc1]

5-(4-phenylbutyl)bicyclo[2.2.1]hept-2-ene;

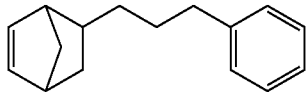 [SMILES: C1=CC2CC1CC2CCCc1ccccc1]

5-(3-phenylpropyl)bicyclo[2.2.1]hept-2-ene;

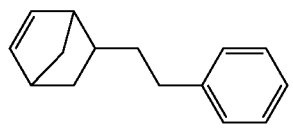

5-phenethylbicyclo[2.2.1]hept-2-ene;

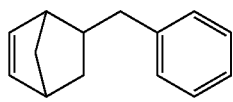 [SMILES: C1=CC2CC1CC2Cc1ccccc1]

5-benzylbicyclo[2.2.1]hept-2-ene;

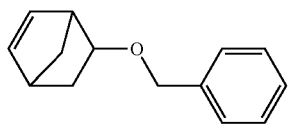 [SMILES: C1=CC2CC1CC2OCc1ccccc1]

5-(benzyloxy)bicyclo[2.2.1]hept-2-ene;

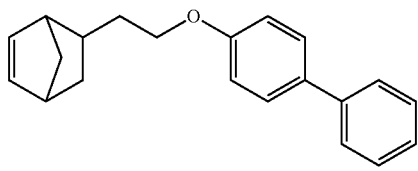 [SMILES: C1=CC2CC1CC2CCOc1ccc(-c2ccccc2)cc1]

5-(2-([1,1'-biphenyl]-4-yloxy)ethyl)bicyclo[2.2.1]hept-2-ene;

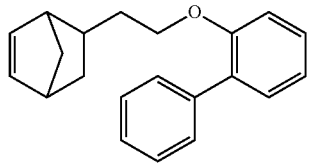 [SMILES: C1=CC2CC1CC2CCOc1ccccc1-c1ccccc1]

5-(2-([1,1'-biphenyl]-2-yloxy)ethyl)bicyclo[2.2.1]hept-2-ene;

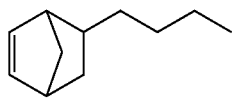

5-butylbicyclo[2.2.1]hept-2-ene;

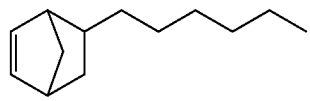

5-hexylbicyclo[2.2.1]hept-2-ene;

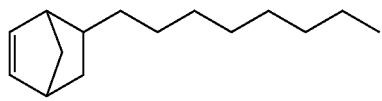

5-octylbicyclo[2.2.1]hept-2-ene;

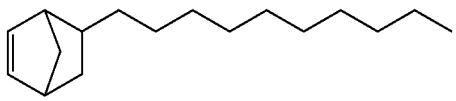 [SMILES: CCCCCCCCCCC1CC2C=CC1C2]

5-decylbicyclo[2.2.1]hept-2-ene;

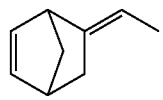

5-ethylidenebicyclo[2.2.1]hept-2-ene;

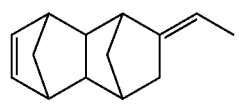

2-ethylidene-1,2,3,4,4a,5,8,8a-octahydro-1,4:5,8-dimethanonaphthalene;

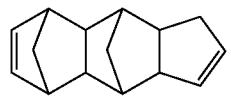 [SMILES: C1=CC2C(C1)C1CC2C2C3C=CC(C3)C12]

3a,4,4a,5,8,8a,9,9a-octahydro-1H-4,9:5,8-dimethanocyclopenta[b]naphthalene;

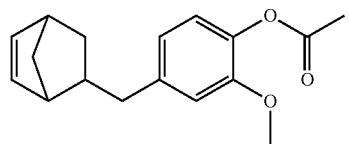 [SMILES: COc1cc(CC2CC3C=CC2C3)ccc1OC(C)=O]

5-norbornenylmethyleugenyl acetate;

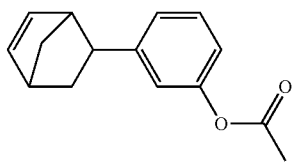 [SMILES: CC(=O)Oc1cccc(C2CC3C=CC2C3)c1]

3-(bicyclo[2.2.1]hept-5-en-2-yl)phenyl acetate;

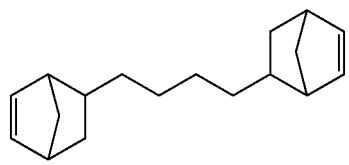 [SMILES: C1=CC2CC1CC2CCCCC1CC2C=CC1C2]

1,4-di(bicyclo[2.2.1]hept-5-en-2-yl)butane (NBBuNB); and

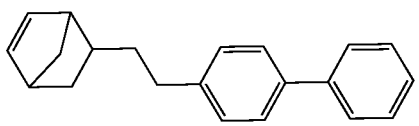

5-(2-([1,1'-biphenyl]-4-yl)ethyl)bicyclo[2.2.1]hept-2-ene.

6. The composition according to claim 1, wherein said one or more monomer of formula (I) is selected from the group consisting of:

tetracyclododecene (TD);

2-phenethyl-1,2,3,4,4a,5,8,8a-octahydro-1,4:5,8-dimethanonaphthalene (PETD);

5-butylbicyclo[2.2.1]hept-2-ene (BuNB);

5-hexylbicyclo[2.2.1]hept-2-ene (HexylNB);

5-decylbicyclo[2.2.1]hept-2-ene (DecylNB);

5-phenethylbicyclo[2.2.1]hept-2-ene (PENB);

5-(2-([1,1'-biphenyl]-4-yloxy)ethyl)bicyclo[2.2.1]hept-2-ene; and 5-(2-([1,1'-biphenyl]-2-yloxy)ethyl)bicyclo[2.2.1]hept-2-ene (NBEtO-2-PhPh);

3a,4,4a,5,8,8a,9,9a-octahydro-1H-4,9:5,8-dimethanocyclopenta[b]naphthalene (CPD3);

and mixtures in any combination thereof.

7. The composition according to claim 1, wherein the organo-ruthenium compound is selected from the group consisting of a compound of formula (IIIA), a compound of formula (IIIB) and a compound of formula (IIIC):

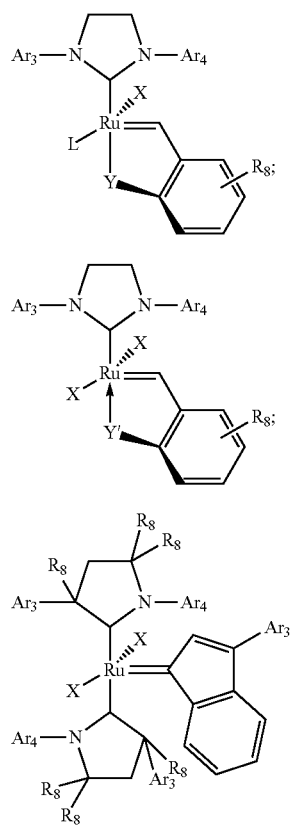

and
wherein:
X is a halogen or an anionic ligand;
Y is selected from the group consisting of O and S;
Y' is $OR_9$ $SR_9$ and —N=CHC(O)O($C_1$-$C_6$)alkyl, where $R_9$ is selected from the group consisting of methyl, ethyl, linear or branched ($C_1$-$C_6$)alkyl, ($C_6$-$C_{10}$)aryl, methoxy, ethoxy, linear or branched ($C_1$-$C_6$)alkoxy, ($C_6$-$C_{10}$)aryloxy, —OCH($CH_3$)C(O)N($CH_3$)(OCH$_3$);
L is $PR_3$ or O=$PR_3$, where R is independently selected from the group consisting of isopropyl, sec-butyl, tert-butyl, cyclohexyl, bicyclo($C_5$-$C_{10}$)alkyl, phenyl, benzyl, isopropoxy, sec-butoxy, tert-butoxy, cyclohexyloxy, phenoxy and benzyloxy; or
X and L form a bidentate anionic ligand of the formula X-L;
$R_7$ is selected from the group consisting of isopropyl, sec-butyl, tert-butyl, substituted or unsubstituted cyclohexyl, substituted or unsubstituted phenyl, substituted or unsubstituted biphenyl and substituted or unsubstituted naphthyl;
$R_8$ is selected from the group consisting of methyl, ethyl, linear or branched ($C_1$-$C_6$)alkyl, ($C_6$-$C_{10}$)aryl, methoxy, ethoxy, linear or branched ($C_1$-$C_6$)alkoxy, ($C_6$-$C_{10}$)aryloxy, —NHCO($C_1$-$C_6$)alkyl, —NHCO-perfluoro($C_1$-$C_6$)alkyl, —SO$_2$N(($C_1$-$C_6$)alkyl)$_2$ and —NO$_2$;
$Ar_1$, $Ar_2$ $Ar_3$ and Ara are the same or different and each independently selected from the group consisting of substituted or unsubstituted phenyl, substituted or unsubstituted biphenyl and substituted or unsubstituted naphthyl;
wherein said substituents are selected from the group consisting of methyl, ethyl, iso-propyl, tert-butyl and phenyl.

8. The composition according to claim 1, wherein the organo-ruthenium compound is selected from the group consisting of:

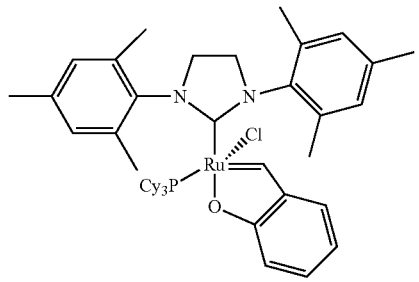

1,3-bis(2,4,6-trimethylphenylimidazolidin-2-ylidene)(tricyclohexylphosphine)-(2-oxobenzylidene)ruthenium (VI) chloride;

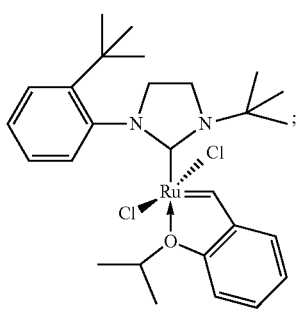

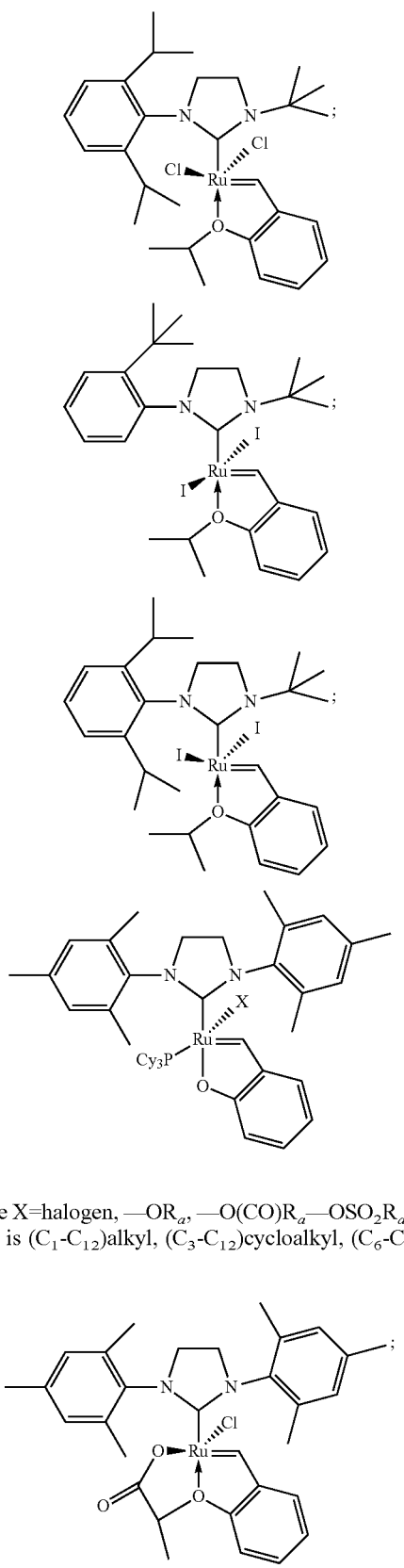
where X=halogen, —OR$_a$, —O(CO)R$_a$—OSO$_2$R$_a$, where R$_a$ is (C$_1$-C$_{12}$)alkyl, (C$_3$-C$_{12}$)cycloalkyl, (C$_6$-C$_{14}$)aryl;
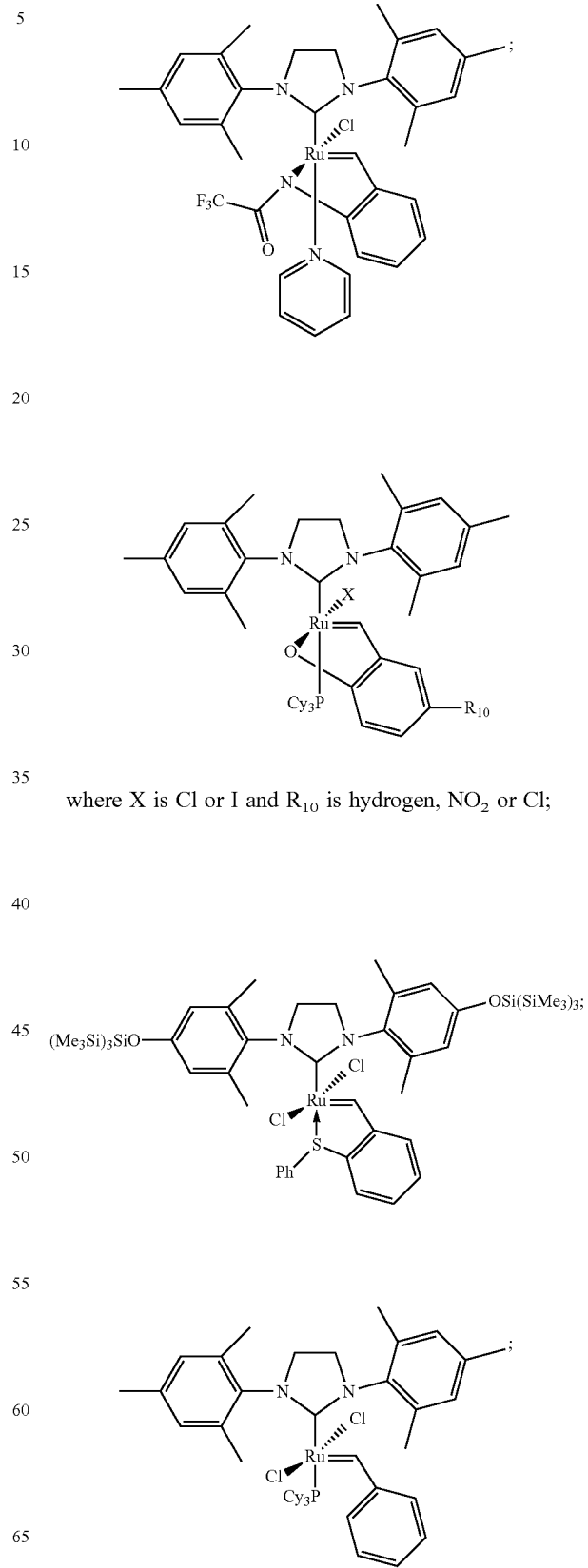
where X is Cl or I and R$_{10}$ is hydrogen, NO$_2$ or Cl;

-continued

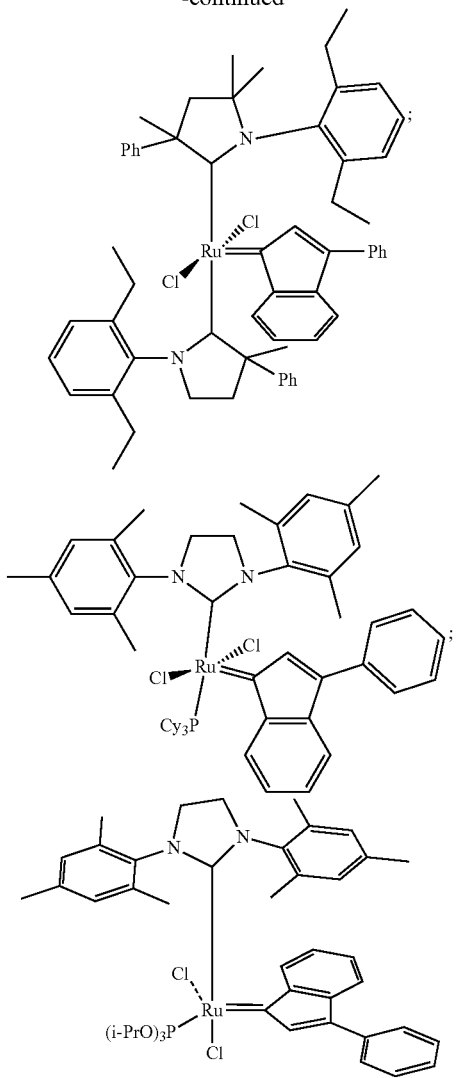

cis-[1,3-Bis(2,4,6-trimethylphenyl)-2-imidazolidi-
nylidene]dichloro(3-phenyl-1H-inden-1-ylidene)(tri-
isopropylphosphite)ruthenium (II); and

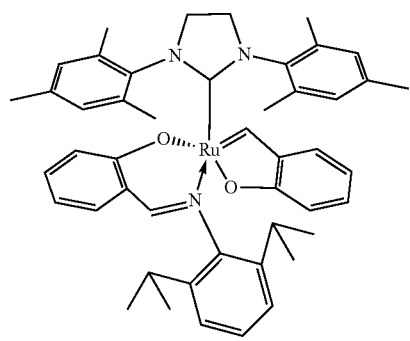

1,3-bis(2,4,6-trimethylphenylimidazolidin-2-ylidene)-(2-
oxobenzylidene)-2-(((2,6-diisopropylphenyl-imino)
methyl)phenoxy)ruthenium.

9. The composition according to claim 1, wherein the compound capable of generating Bronsted acid upon subjecting to photolytic condition is a compound of the formula (V), wherein Y is fluorine, chlorine, bromine and iodine; and $R_{30}$ and $R_{31}$ are the same or different and independently of each other is selected from the group consisting of hydrogen, methoxy, ethoxy, n-propoxy, iso-propoxy, butoxy.

10. The composition according to claim 9, wherein the compound capable of generating Bronsted acid upon subjecting to photolytic condition is selected from the group consisting of:

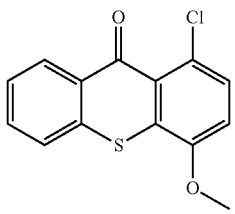 [SMILES: COc1ccc(Cl)c2c(=O)c3ccccc3sc12]

1-chloro-4-methoxy-9H-thioxanthen-9-one;

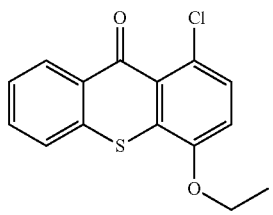 [SMILES: CCOc1ccc(Cl)c2c(=O)c3ccccc3sc12]

1-chloro-4-ethoxy-9H-thioxanthen-9-one;

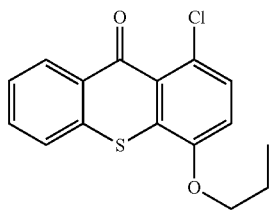

1-chloro-4-propoxy-9H-thioxanthen-9-one;

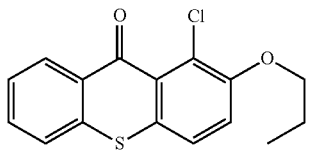 [SMILES: CCCOc1ccc2sc3ccccc3c(=O)c2c1Cl]

1-chloro-2-propoxy-9H-thioxanthen-9-one;

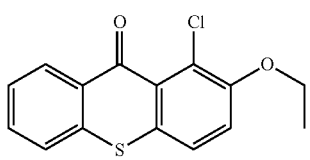 [SMILES: CCOc1ccc2sc3ccccc3c(=O)c2c1Cl]

1-chloro-2-ethoxy-9H-thioxanthen-9-one;

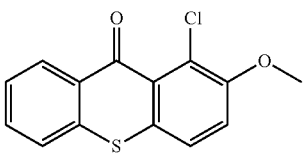 [SMILES: COc1ccc2sc3ccccc3c(=O)c2c1Cl]

1-chloro-2-methoxy-9H-thioxanthen-9-one;

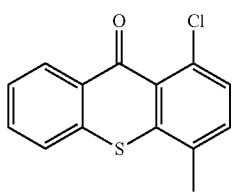 [SMILES: Cc1ccc(Cl)c2c(=O)c3ccccc3sc12]

1-chloro-4-methyl-9H-thioxanthen-9-one;

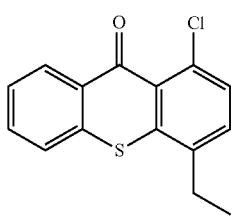 [SMILES: CCc1ccc(Cl)c2c(=O)c3ccccc3sc12]

1-chloro-4-ethyl-9H-thioxanthen-9-one;

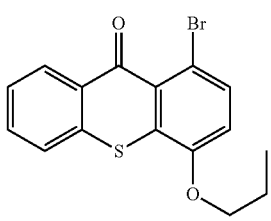 [SMILES: CCCOc1ccc(Br)c2c(=O)c3ccccc3sc12]

1-bromo-4-propoxy-9H-thioxanthen-9-one;

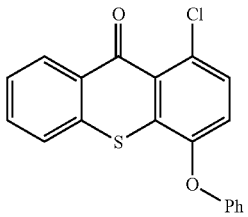 [SMILES: O=c1c2ccccc2sc2c(Oc3ccccc3)ccc(Cl)c12]

1-chloro-4-phenoxy-9H-thioxanthen-9-one;

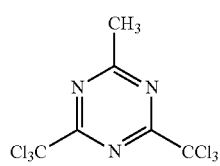

2-methyl-4,6-bis(trichloromethyl)-1,3,5-triazine;

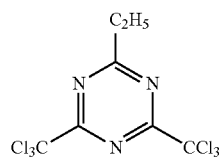

2-ethyl-4,6-bis(trichloromethyl)-1,3,5-triazine;

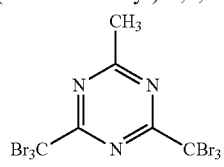

2-methyl-4,6-bis(tribromomethyl)-1,3,5-triazine;

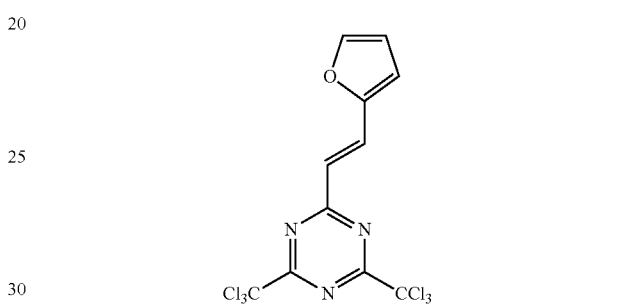

2-(2-(furan-2-yl)vinyl)-4,6-bis(trichloromethyl)-1,3,5-triazine;

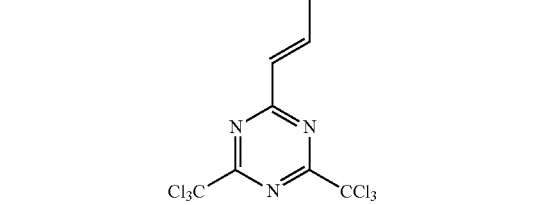

2-(2-(thiophen-2-yl)vinyl)-4,6-bis(trichloromethyl)-1,3,5-triazine;

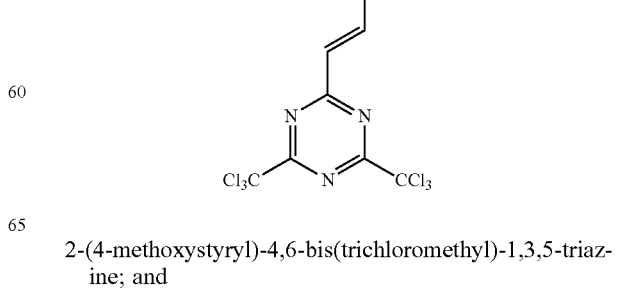

2-(4-methoxystyryl)-4,6-bis(trichloromethyl)-1,3,5-triazine; and

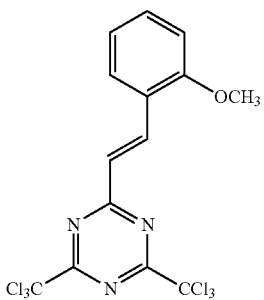

2-(2-methoxystyryl)-4,6-bis(trichloromethyl)-1,3,5-triazine.

11. The composition according to claim 1, which is selected from the group consisting of:

a mixture of 2-phenethyl-1,2,3,4,4a,5,8,8a-octahydro-1,4:5,8-dimethanonaphthalene (PETD), 3,7,14-tris(((2-(bicyclo[2.2.1]hept-5-en-2-yl)ethyl)dimethylsilyl)oxy)-1,3,5,7,9,11,14-heptaisobutyl-2,4,6,8,10,12,13,15,16-nonaoxa-1,3,5,7,9,11,14-heptasilatricyclo[7.3.3.15,11]hexadecane (trisnorbornenylisobutyl-POSS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX);

a mixture of 2-phenethyl-1,2,3,4,4a,5,8,8a-octahydro-1,4:5,8-dimethanonaphthalene (PETD), 3,3'-oxybis(1,5-bis(2-(bicyclo[2.2.1]hept-5-en-2-yl)ethyl)-3-cyclohexyl-1,1,5,5-tetramethyltrisiloxane)(TeTENBOMSS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX);

a mixture of 2-phenethyl-1,2,3,4,4a,5,8,8a-octahydro-1,4:5,8-dimethanonaphthalene (PETD), 3a,4,4a,5,8,8a,9,9a-octahydro-1H-4,9:5,8-dimethanocyclopenta[b]naphthalene (CPD3), 3,3'-oxybis(1,5-bis(2-(bicyclo[2.2.1]hept-5-en-2-yl)ethyl)-3-cyclohexyl-1,1,5,5-tetramethyltrisiloxane)(TeTENBOMSS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX);

a mixture of 2-phenethyl-1,2,3,4,4a,5,8,8a-octahydro-1,4:5,8-dimethanonaphthalene (PETD), 3a,4,4a,5,8,8a,9,9a-octahydro-1H-4,9:5,8 dimethanocyclopenta[b]naphthalene (CPD3), 1,3-bis(2-bicyclo[2.2.1]hept-5-en-2-yl)ethyl)-1,1,3,3-tetramethyldisiloxane (BisENBTMDS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX); and a mixture of 2-hexyl-1,2,3,4,4a,5,8,8-octahydro-1,4:5,8-dimethanonaphthalene (HexylTD), 3a,4,4a,5,8,8a,9,9a-octahydro-1H-4,9:5,8-dimethanocyclopenta[b]naphthalene (CPD3), 1,3-bis(2-(bicyclo[2.2.1]hept-5-en-2-yl)ethyl)-1,1,3,3-tetramethyldisiloxane (BisENBTMDS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

12. A kit for forming a three dimensional object comprising:

a) one or more monomers of formula (I):

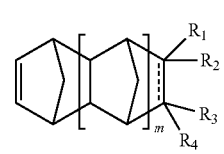

wherein:

m is an integer 0, 1 or 2;

----- is a single bond or a double bond;

$R_1$, $R_2$, $R_3$ and $R_4$ are the same or different and each independently selected from the group consisting of hydrogen, halogen, methyl, ethyl, linear or branched $(C_3-C_{16})$alkyl, $(C_2-C_{16})$alkenyl, perfluoro$(C_1-C_{12})$alkyl, $(C_3-C_{12})$cycloalkyl, $(C_6-C_{12})$bicycloalkyl, $(C_7-C_{14})$tricycloalkyl, methoxy, ethoxy, linear or branched $(C_3-C_{16})$alkoxy, $(C_2-C_6)$acyl, $(C_2-C_6)$acyloxy, $(C_6-C_{14})$aryl, $(C_6-C_{14})$aryl$(C_1-C_6)$alkyl, perfluoro$(C_6-C_{14})$aryl, perfluoro$(C_6-C_{14})$aryl$(C_1-C_3)$alkyl, $(C_6-C_{14})$aryloxy, $(C_6-C_{14})$aryl$(C_1-C_6)$alkoxy, tri$(C_1-C_6)$alkoxysilyl and a group of formula (A):

—Z-Aryl      (A)

wherein:

Z is a bond or a group selected from the group consisting of:

$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—(CO)O—$(CR_5R_6)_b$, $(CR_5R_6)_a$—O(CO)—$(CR_5R_6)_b$, $(CR_5R_6)_a$—(CO)—$(CR_5R_6)_b$, where a and b are integers which may be the same or different and each independently is 1 to 12;

$R_5$ and $R_6$ are the same or different and each independently selected from the group consisting of hydrogen, methyl, ethyl, linear or branched $(C_3-C_6)$alkyl, methoxy, ethoxy, linear or branched $(C_3-C_6)$alkyloxy, $(C_2-C_6)$acyl, $(C_2-C_6)$acyloxy, phenyl and phenoxy;

Aryl is phenyl or phenyl substituted with one or more of groups selected from the group consisting of methyl, ethyl, linear or branched $(C_3-C_6)$alkyl, hydroxy, methoxy, ethoxy, linear or branched $(C_3-C_6)$alkyloxy, $(C_2-C_6)$acyl, $(C_2-C_6)$acyloxy, phenyl and phenoxy; or one of $R_1$ or $R_2$ taken together with one of $R_3$ or $R_4$ and the carbon atoms to which they are attached to form a $(C_5-C_7)$carbocyclic ring optionally containing one or more double bonds;

b) one or more compounds selected from the group consisting of:

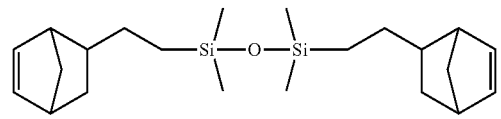 [SMILES: C[Si](C)(CCC1CC2C=CC1C2)O[Si](C)(C)CCC1CC2C=CC1C2]

1,3-bis(2-(bicyclo[2.2.1]hept-5-en-2-yl)ethyl)-1,1,3,3-tetramethyldisiloxane (BisENBTMDS);

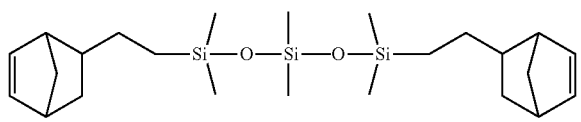

1,5-bis(2-(bicyclo[2.2.1]hept-5-en-2-yl)ethyl)-1,1,3,3,5,5-hexamethyltrisiloxane (BisENBHMTS);

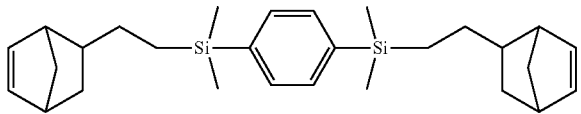 [SMILES: C[Si](C)(CCC1CC2C=CC1C2)c1ccc([Si](C)(C)CCC2CC3C=CC2C3)cc1]

1,4-bis((2-(bicyclo[2.2.1]hept-5-en-2-yl)ethyl)dimethylsilyl)benzene;

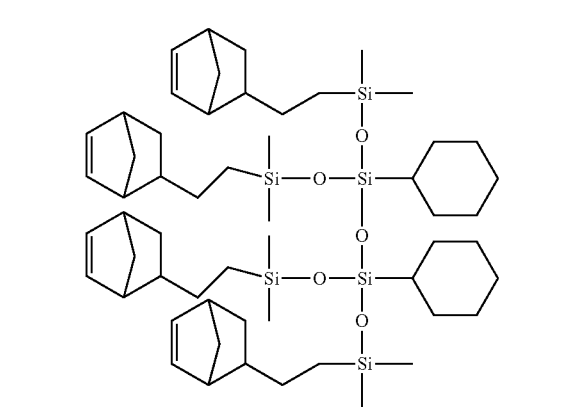

3,3'-oxybis(1,5-bis(2-(bicyclo[2.2.1]hept-5-en-2-yl)ethyl)-3-cyclohexyl-1,1,5,5-tetramethyltrisiloxane) (TeTENBOMSS); and

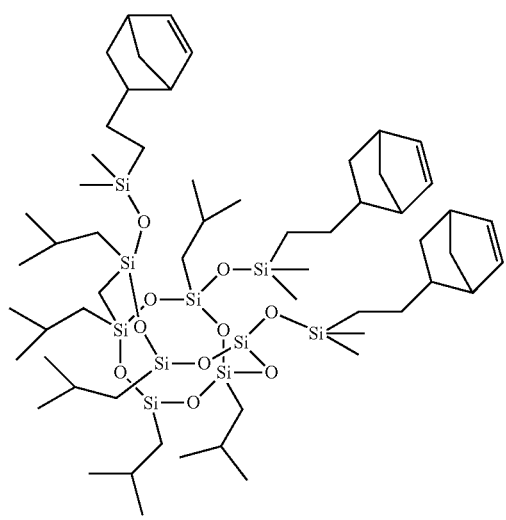

3,7,14-tris(((2-(bicyclo[2.2.1]hept-5-en-2-yl)ethyl)dimethylsilyl)oxy)-1,3,5,7,9,11,14-heptaisobutyl-2,4,6,8,10,12,13,15,16-nonaoxa-1,3,5,7,9,11,14-heptasilatricyclo[7.3.3.1⁵,¹¹]hexadecane (trisnorbornenylisobutyl POSS);

c) an organo-ruthenium compound selected from the group consisting of:

a compound of formula (IIB):

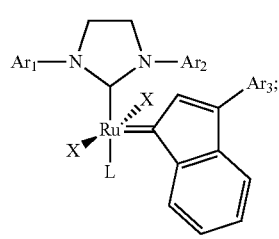

(IIB)

a compound of formula (IIIA):

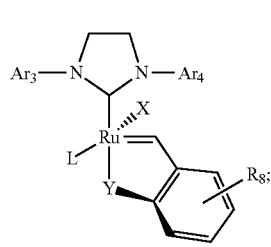

(IIIA)

a compound of formula (IIIB):

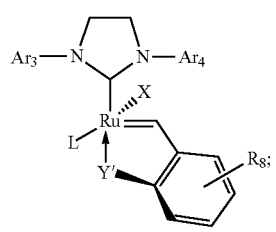

(IIIB)

a compound of formula (IIIC):

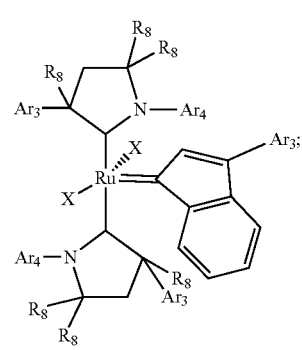

(IIIC)

and

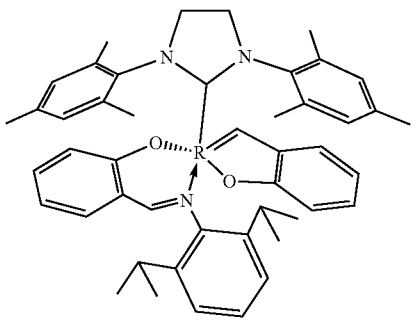

1,3-bis(2,4,6-trimethylphenylimidazolidin-2-ylidene)-(2-oxobenzylidene)-2-(((2,6-diisopropylphenyl-imino)methyl)phenoxy)ruthenium;

wherein:

X is a halogen or an anionic ligand;

Y is selected from the group consisting of O and S;

Y' is $OR_9$ $SR_9$ and —N═CHC(O)O($C_1$-$C_6$)alkyl, where $R_9$ is selected from the group consisting of methyl, ethyl, linear or branched ($C_1$-$C_6$)alkyl, ($C_6$-$C_{10}$)aryl, methoxy, ethoxy, linear or branched ($C_1$-$C_6$)alkoxy, ($C_6$-$C_{10}$)aryloxy, —OCH($CH_3$)C(O)N($CH_3$)($OCH_3$);

L is $PR_3$ or O═$PR_3$, where R is independently selected from the group consisting of isopropyl, sec-butyl, tert-butyl, cyclohexyl, bicyclo($C_5$-$C_{10}$)alkyl, phenyl, benzyl, isopropoxy, sec-butoxy, tert-butoxy, cyclohexyloxy, phenoxy and benzyloxy; or X and L form a bidentate anionic ligand of the formula X-L;

$R_7$ is selected from the group consisting of isopropyl, sec-butyl, tert-butyl, substituted or unsubstituted cyclohexyl, substituted or unsubstituted phenyl, substituted or unsubstituted biphenyl and substituted or unsubstituted naphthyl;

$R_8$ is selected from the group consisting of methyl, ethyl, linear or branched ($C_1$-$C_6$)alkyl, ($C_6$-$C_{10}$)aryl, methoxy, ethoxy, linear or branched ($C_1$-$C_6$)alkoxy, ($C_6$-$C_{10}$)aryloxy, —NHCO($C_1$-$C_6$)alkyl, —NHCO-perfluoro($C_1$-$C_6$)alkyl, —$SO_2$N(($C_1$-$C_6$)alkyl)$_2$ and —$NO_2$;

$Ar_1$, $Ar_2$ $Ar_3$ and Ara are the same or different and each independently selected from the group consisting of substituted or unsubstituted phenyl, substituted or unsubstituted biphenyl and substituted or unsubstituted naphthyl;

wherein said substituents are selected from the group consisting of methyl, ethyl, iso-propyl, tert-butyl and phenyl; and d) a compound of formula (V):

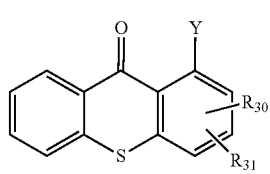

(V)

wherein

Y is halogen; and $R_{30}$ and $R_{31}$ are the same or different and independently of each other selected from hydrogen, methyl, ethyl, linear or branched ($C_3$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl and ($C_6$-$C_{10}$)-aryloxy.

13. The kit according to claim 12, which contains a compound of formula (V) selected from the group consisting of:

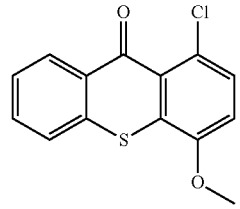

1-chloro-4-methoxy-9H-thioxanthen-9-one;

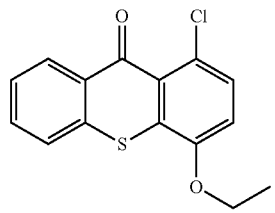 [SMILES: CCOc1ccc(Cl)c2c(=O)c3ccccc3sc12]

1-chloro-4-ethoxy-9H-thioxanthen-9-one;

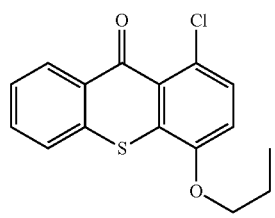

1-chloro-4-propoxy-9H-thioxanthen-9-one;

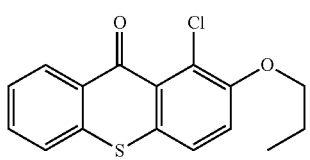

1-chloro-2-propoxy-9H-thioxanthen-9-one;

1-chloro-2-ethoxy-9H-thioxanthen-9-one;

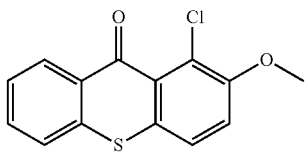 [SMILES: COc1ccc2sc3ccccc3c(=O)c2c1Cl]

1-chloro-2-methoxy-9H-thioxanthen-9-one;

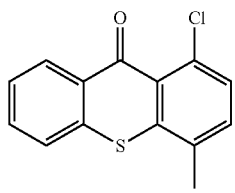 [SMILES: Cc1ccc(Cl)c2c(=O)c3ccccc3sc12]

1-chloro-4-methyl-9H-thioxanthen-9-one;

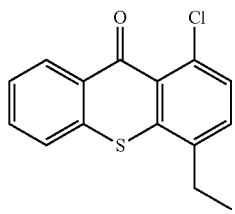 [SMILES: CCc1ccc(Cl)c2c(=O)c3ccccc3sc12]

1-chloro-4-ethyl-9H-thioxanthen-9-one;

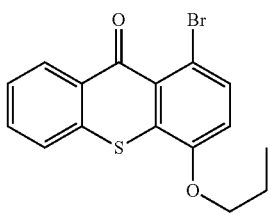 [SMILES: CCCOc1ccc(Br)c2c(=O)c3ccccc3sc12]

1-bromo-4-propoxy-9H-thioxanthen-9-one; and

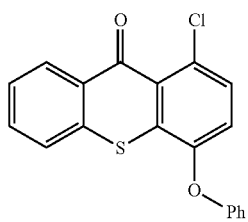 [SMILES: O=c1c2ccccc2sc2c(Oc3ccccc3)ccc(Cl)c12]

1-chloro-4-phenoxy-9H-thioxanthen-9-one.

14. The kit according to claim 12, which contains at least two monomers of formula (I) distinct from one another, wherein one monomer is completely soluble in the other monomer, and when said composition is exposed to radiation at 395 nm for a sufficient length of time it forms a three dimensional object.

15. The kit according to claim 12, which contains a mixture of 2-phenethyl-1,2,3,4,4a,5,8,8a-octahydro-1,4:5,8-dimethanonaphthalene (PETD), 3a,4,4a,5,8,8a,9,9a-octahydro-1H-4,9:5,8-dimethanocyclopenta[b]naphthalene (CPD3), 1,3-bis(2-(bicyclo[2.2.1]hept-5-en-2-yl)ethyl)-1,1,3,3-tetramethyldisiloxane (BisENBTMDS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

16. The kit according to claim 12, which contains a mixture of 2-hexyl-1,2,3,4,4a,5,8,8a-octahydro-1,4:5,8-dimethanonaphthalene (HexylTD), 3a,4,4a,5,8,8a,9,9a-octahydro-1H-4.9:5,8-dimethanocyclopenta[b]naphthalene (CPD3), 1,3-bis(2-(bicyclo[2.2.1]hept-5-en-2-yl)ethyl)-1,1,3,3-tetramethyldisiloxane (BisENBTMDS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

17. The kit according to claim 12, which contains a mixture of 2-phenethyl-1,2,3,4,4a,5,8,8a-octahydro-1,4:5,8-dimethanonaphthalene (PETD), 3,7,14-tris(((2-bicyclo[2.2.1]hept-5-en-2-yl)ethyl)dimethylsilyl)oxy)-1,3,5,7,9,11,14-heptaisobutyl-2,4,6,8,10,12,13,15,16-nonaoxa-1,3,5,7,9,11,14-heptasilatricyclo[7.3.3.15,11]hexadecane (trisnorbornenylisobutyl POSS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

18. A three dimensional object comprising the composition of claim 1.

19. The kit according to claim 12, which contains a mixture of 2-phenethyl-1,2,3,4,4a,5,8,8a-octahydro-1,4:5,8-dimethanonaphthalene (PETD), 3,3'-oxybis(1,5-bis(2-(bicyclo[2.2.1]hept-5-en-2-yl)ethyl)-3-cyclohexyl-1,1,5,5-tetramethyltrisiloxane) (TeTENBOMSS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

20. The kit according to claim 12, which contains a mixture of 2-phenethyl-1,2,3,4,4a,5,8,8a-octahydro-1,4:5,8-dimethanonaphthalene (PETD), 3a,4,4a,5,8,8a,9,9a-octahydro-1H-4,9:5,8-dimethanocyclopenta[b]naphthalene (CPD3), 3,3'-oxybis(1,5-bis(2-(bicyclo[2.2.1]hept-5-en-2-yl)ethyl)-3-cyclohexyl-1,1,5,5-tetramethyltrisiloxane) (TeTENBOMSS), 1,3-bis(2,4,6-trimethylphenylimidazolidin-2-ylidene)-(2-oxobenzylidene)-2-(((2,6-diisopropylphenyl-imino)methyl)phenoxy)ruthenium and 1-chloro-4-propoxy-9H-thioxanthen-9-one (CPTX).

* * * * *